April 28, 1964  L. ERHARDT ETAL  3,130,949
SUPPORT FOR LIGHTING AND BUILDING FIXTURES AND THE LIKE
Filed July 2, 1962  7 Sheets-Sheet 5
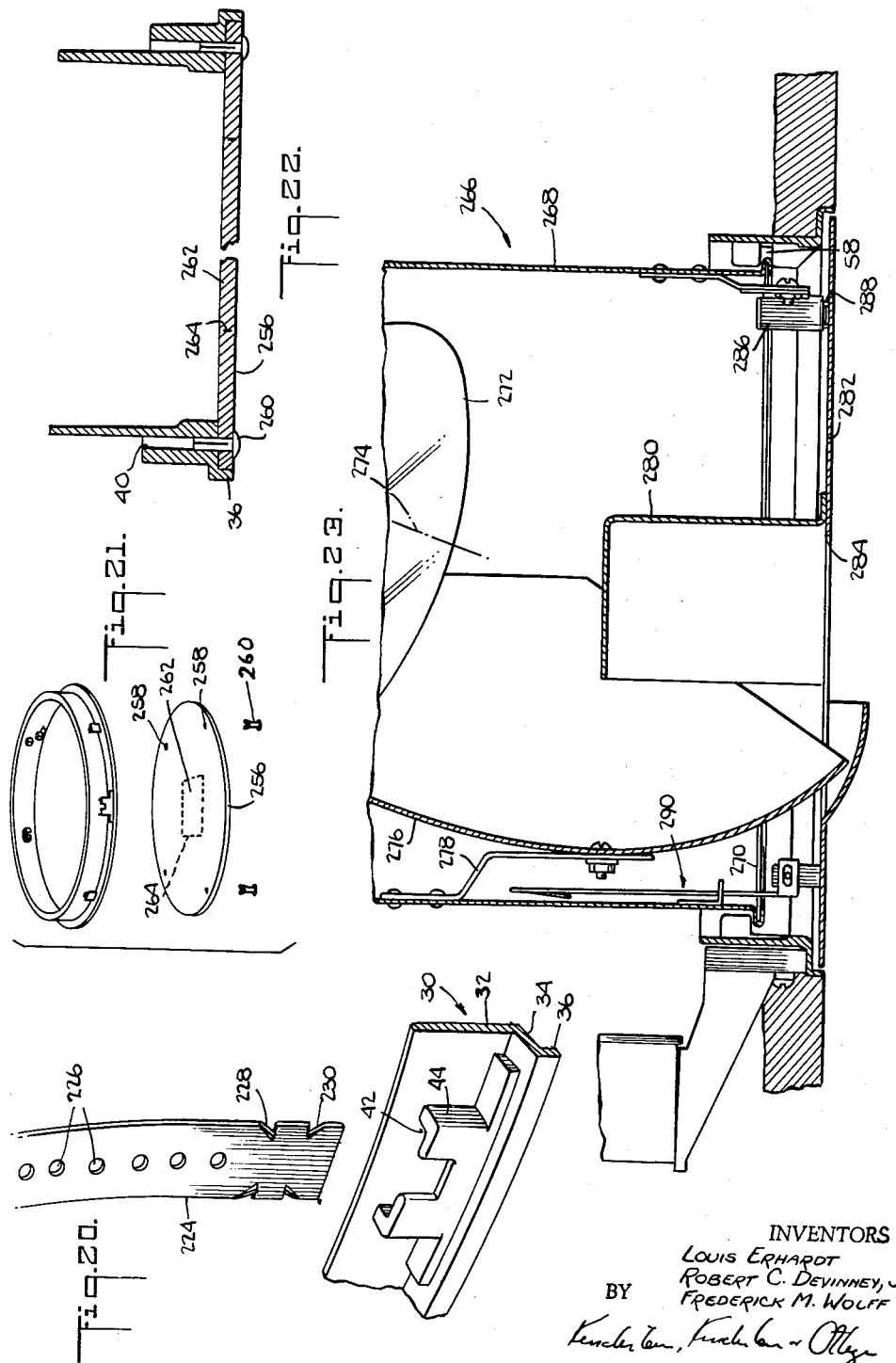
INVENTORS
LOUIS ERHARDT
ROBERT C. DEVINNEY, JR.
BY FREDERICK M. WOLFF
ATTORNEYS April 28, 1964 L. ERHARDT ETAL 3,130,949
SUPPORT FOR LIGHTING AND BUILDING FIXTURES AND THE LIKE
Filed July 2, 1962 7 Sheets-Sheet 6
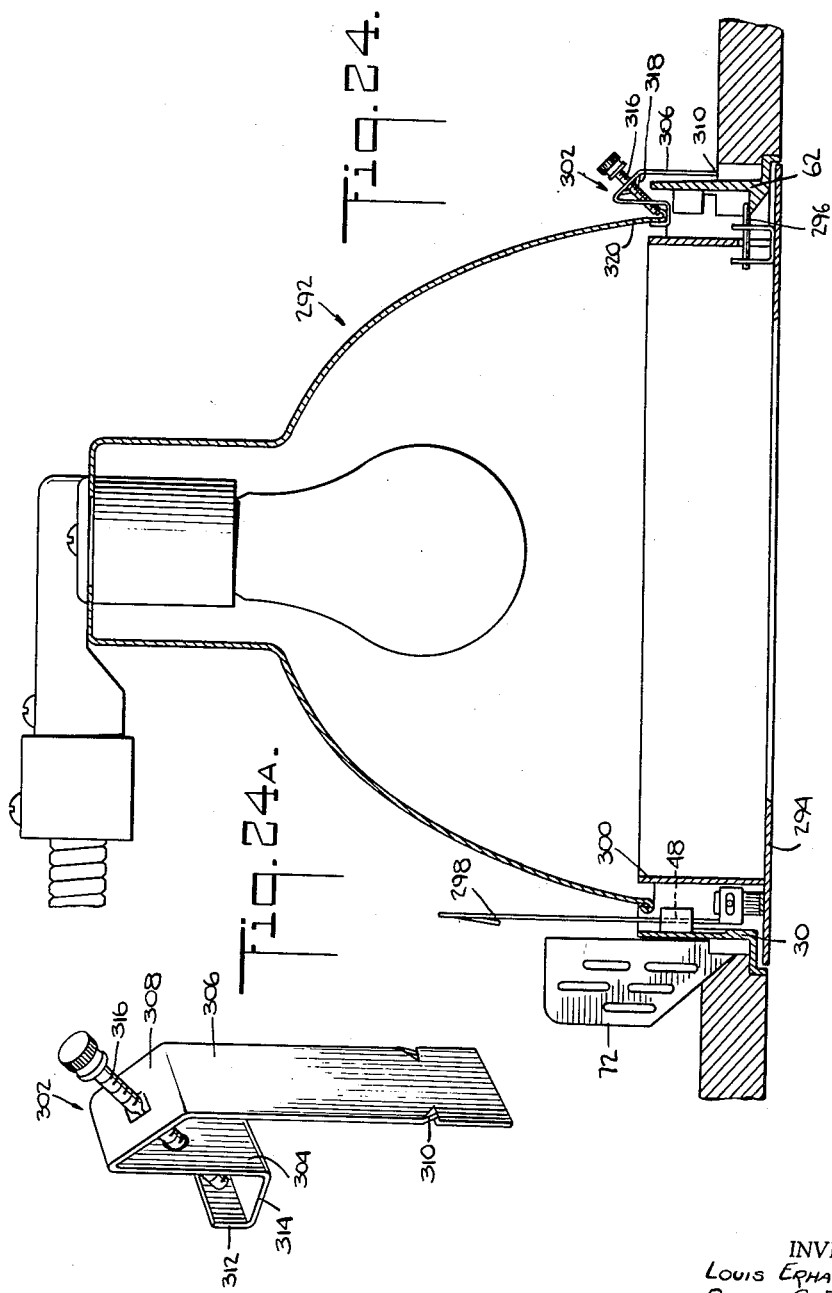
INVENTORS
LOUIS ERHARDT
ROBERT C. DEVINNEY, JR.
FREDERICK M. WOLFF
BY
ATTORNEYS

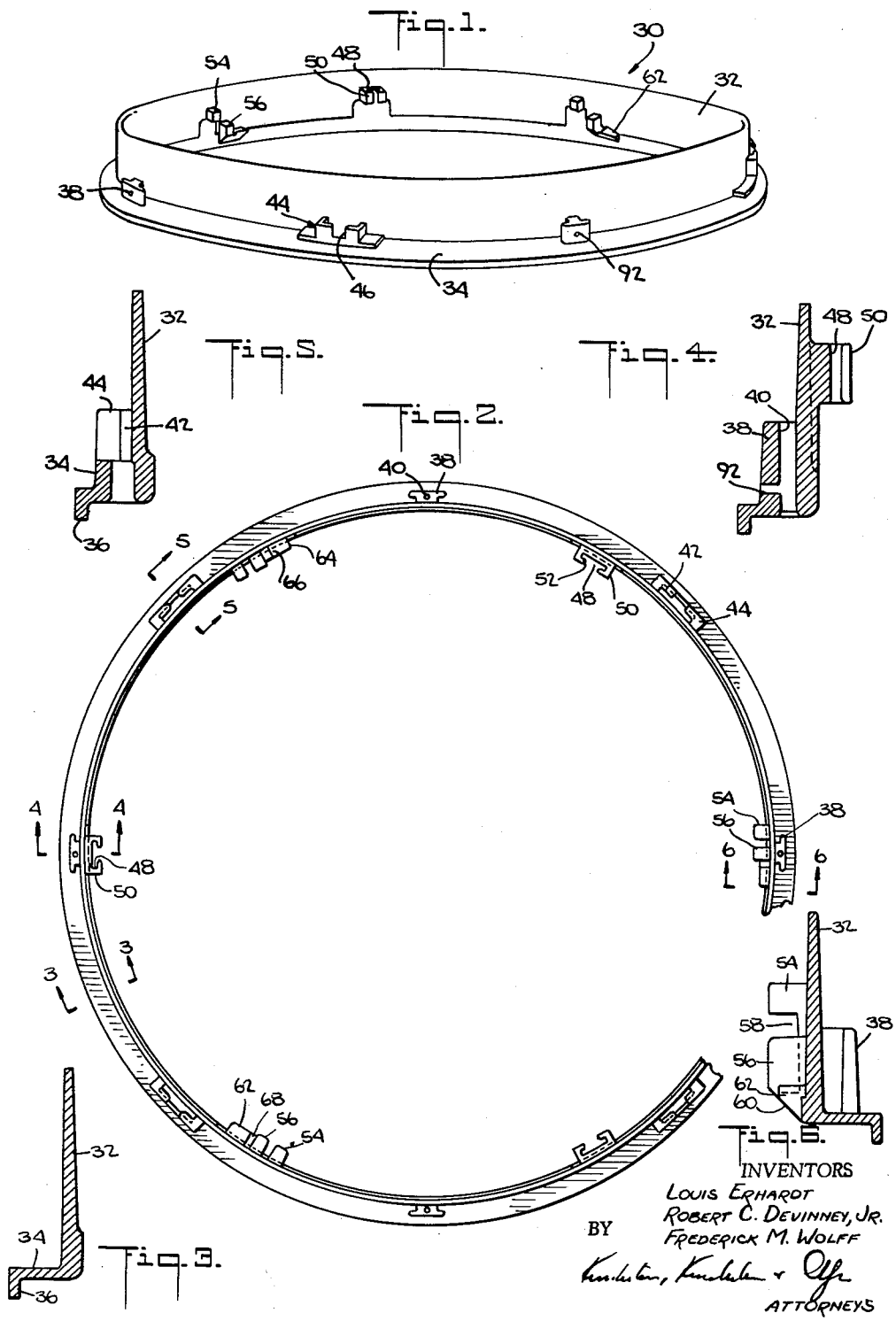

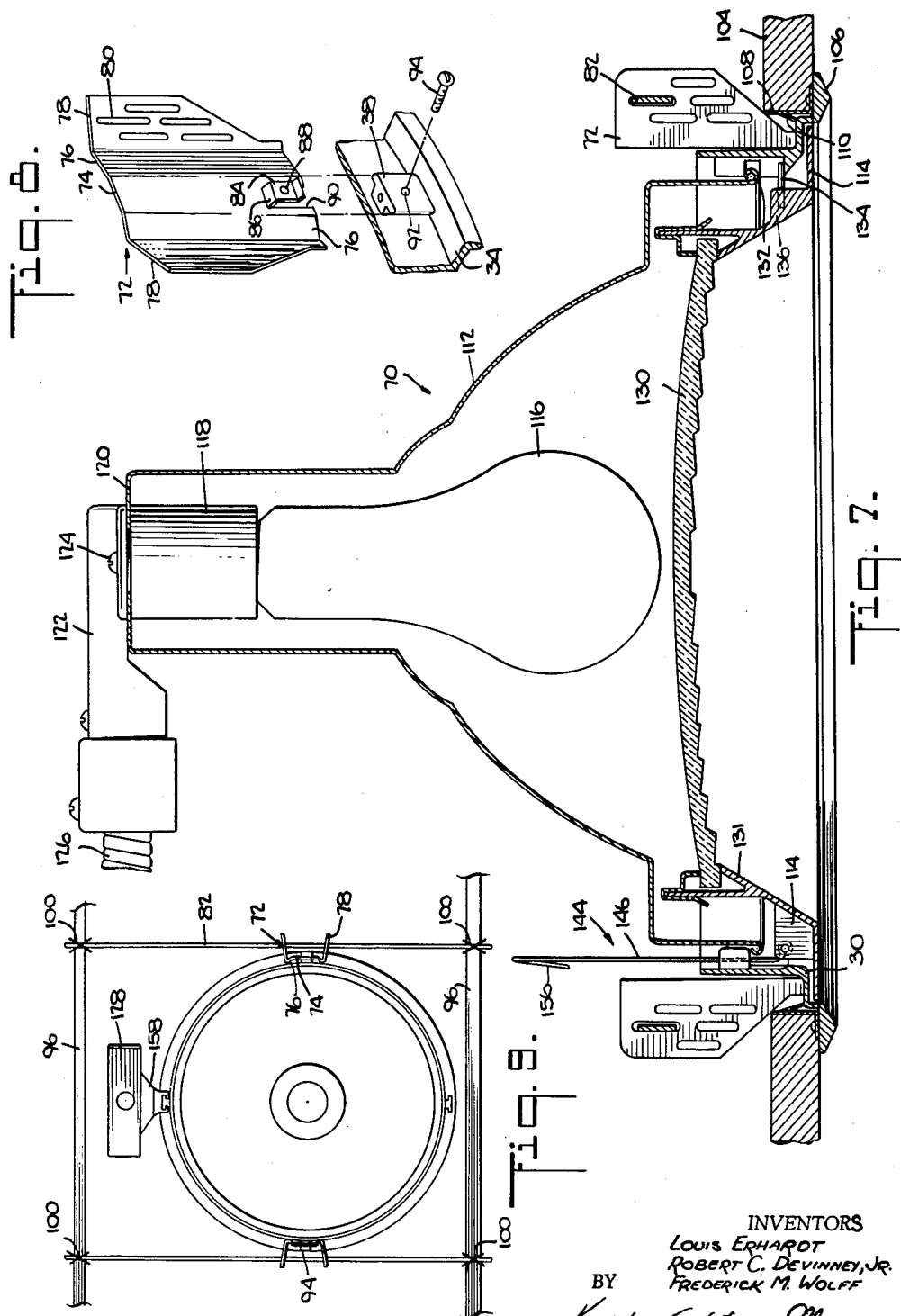

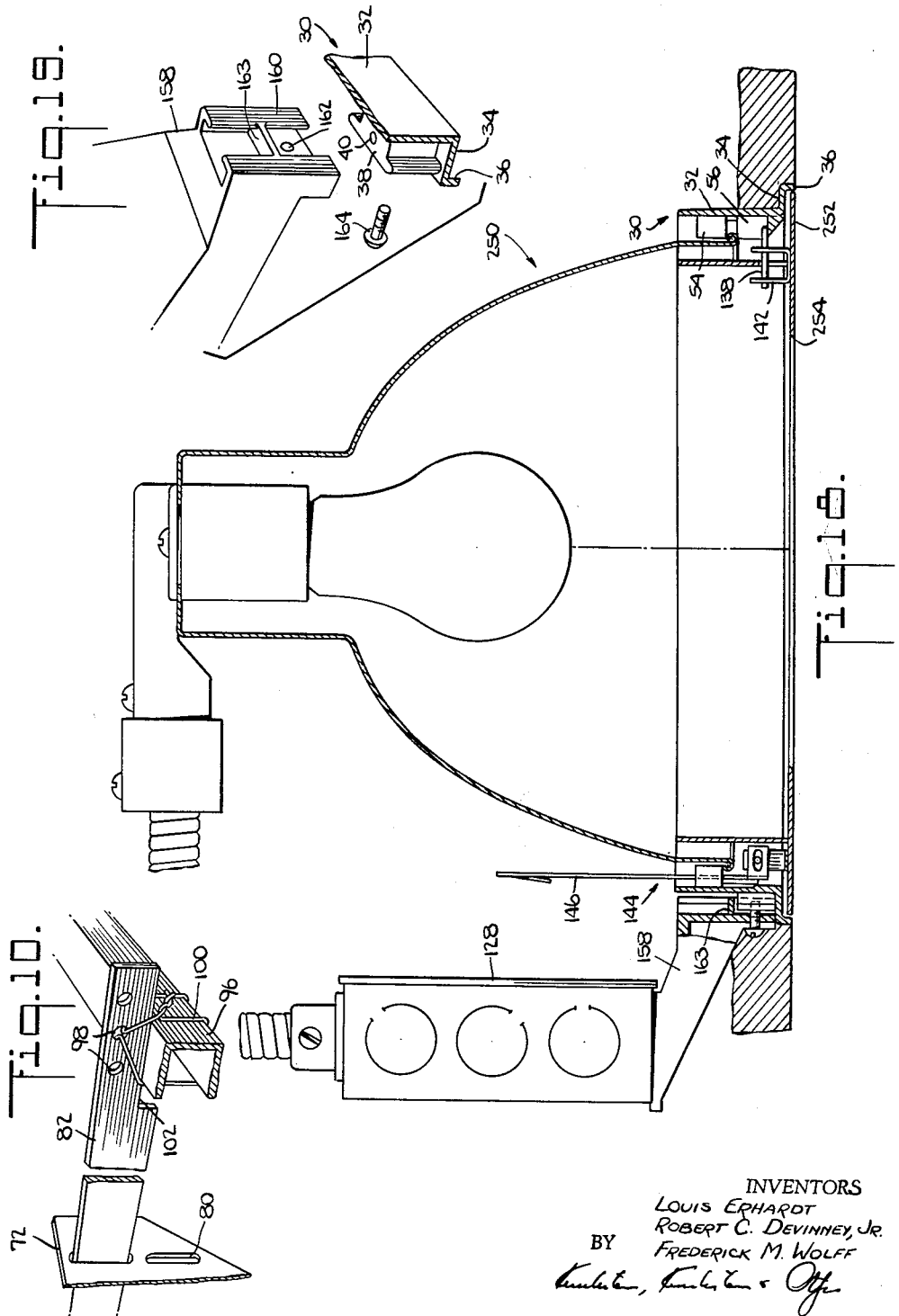

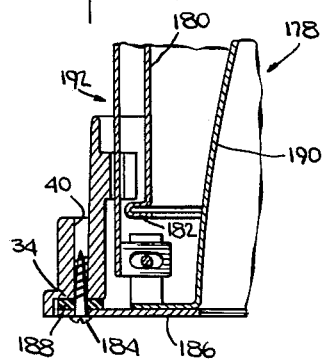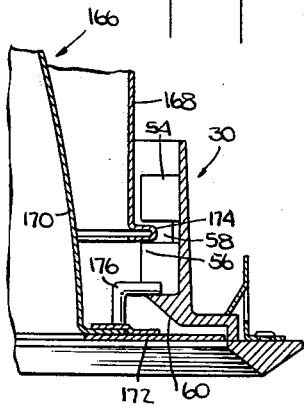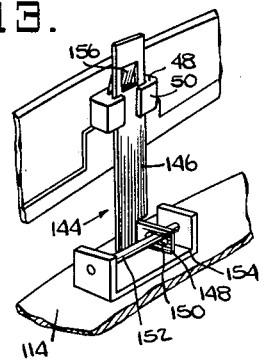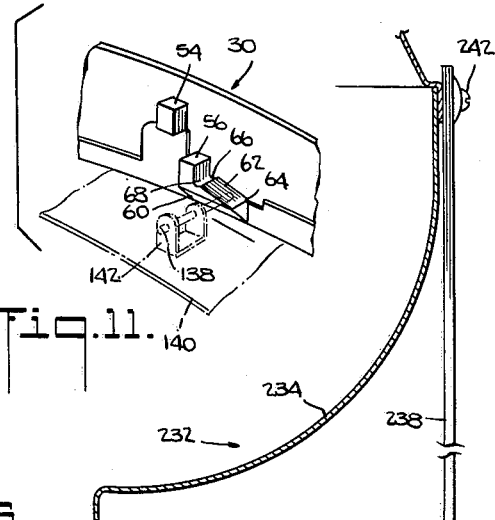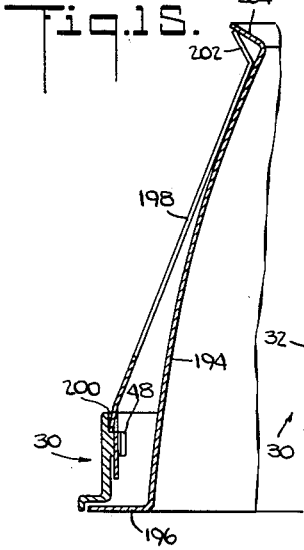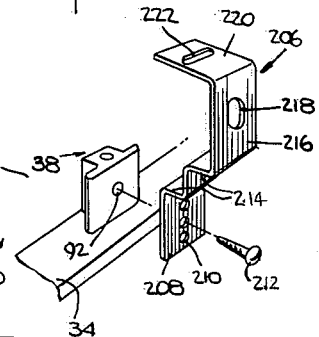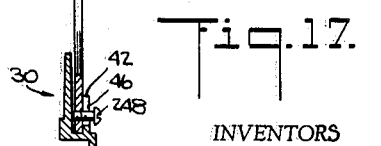

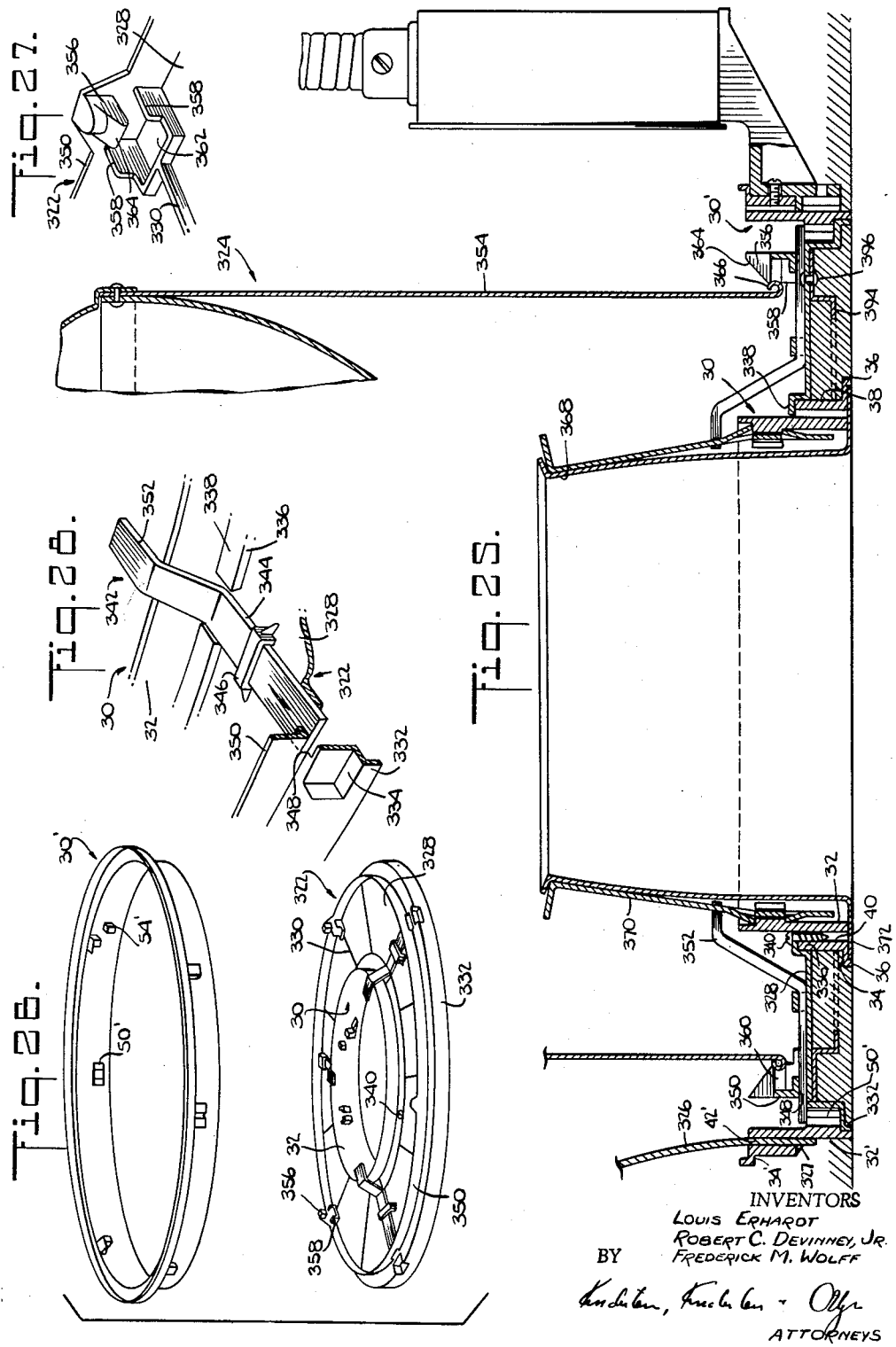

3,130,949
SUPPORT FOR LIGHTING AND BUILDING FIXTURES AND THE LIKE
Louis Erhardt and Robert C. Devinney, Jr., Pacific Palisades, Calif., and Frederick M. Wolff, Montclair, N.J., assignors to Century Lighting, Inc., New York, N.Y., a corporation of New York
Filed July 2, 1962, Ser. No. 206,994
36 Claims. (Cl. 248—343)

This invention relates to supports for lighting and building fixtures and the like. More particularly, our invention is concerned with a novel plaster ring and adjuncts therefor which enable the same to be universally used to support a large selection of various types of fixtures having a common mounting diameter.

The term "plaster ring" as it has come to be used in the lighting and building fixture art, denotes a mounting ring which conventionally is located in the ceiling (although sometimes in a wall) and defines an opening therein above or within which a lighting or other appliance is disposed. The adjective "plaster" in the term "plaster ring" is somewhat of a misnomer according to present-day practice and actually is a carry-over from the time when all ceilings were formed of plaster, the rings usually having been set therein prior to the plastering operation. However, at present ceilings are not made exclusively of plaster ("plaster" is used herein in its broadest sense to indicate a hardenable, semi-solid substance), but also include so-called "dry wall" ceilings, as for example, ceilings made from preformed sheets of plasterboard or fiberboard or from tiles. Accordingly, although we heretofore have called the ring which is the principal subject of the present invention a "plaster" ring we will hereinafter refer to it as a "mounting" ring.

Until now, it has been conventional to tailor, i.e. specially design, mounting rings to specific fixtures, so that quite customarily after a mounting ring has once been installed only a particular type or limited types of fixtures can be coupled thereto. Mounting rings usually are permanently installed in the substructure of a ceiling or wall during an early stage of construction and thereafter are integrated with the finished ceiling surface. If at any given stage it is desired to change the type of lighting fixture, it usually is necessary to rip out and replace the mounting ring. This is time consuming and costly even if it is performed before the finished ceiling is emplaced, but it is particularly troublesome if the ring has to be replaced after the ceiling has been finished.

Another drawback of previous mounting rings is that due to their comparatively large diameter and simple form it is the custom to make them of sheet metal such as sheet steel. As a matter of economy comparatively thin steel is used. Hence, the mounting rings are not sufficiently rigid to retain their shapes and if they are not installed carefully, will not correctly accept lighting fixtures. Furthermore, these mounting rings tend to rust, particularly when wet plaster is applied in their vicinity and they cause ugly red strains to spread on the ceiling.

In addition, it has for some time been the practice to fabricate ceilings in many buildings with a form of plaster that is blown into place, e.g., plaster particles suspended in a rapidly moving air stream, usually in conjunction with a filler such as asbestos fibres. Unlike plaster that is precisely applied by hand, plaster blown onto a ceiling does not have a carefully delimited area of application and it tends to enter all openings and to spread over the entire surface of a ceiling. In cannot, for example, be kept away from the mounting rings, so that the rings become drenched in wet plaster, and, indeed, even the insides of the rings become coated with wet plaster which must be wiped and scraped off.

Another difficulty of present-day mounting rings is that they are secured in place to the substructural elements of a ceiling in various random fashions which tend to be more or less slipshod and do not provide for nice positioning of the rings and of the fixtures to be secured therein.

It is an object of our invention to provide a mounting ring which overcomes these various disadvantages, and others known to the trade, of old style mounting rings.

It is another object of our invention to provide a mounting ring which is rigid and sturdy, which can be manufactured to close tolerances of size and shape, which is resistant to the deleterious effects of wet plaster and which, withal, is of a simple and inexpensive construction.

It is another object of our invention to provide a standardized mounting ring of the character described which is adapted to receive many types of fixtures of the same diameter within a single given ring, so that it is not necessary to tear out and replace a previously installed ring when a fixture is to be changed.

It is another object of our invention to provide a multifunctional mounting ring which is capable of cooperating in various ways with different types of fixtures so as to enable these fixtures to be used to their best advantage and for their individual special functions.

It is another object of our invention to provide a mounting ring which can be quickly, firmly and precisely coupled to the substructural elements of a ceiling and which permits of small, i.e., fine, adjustments in the positioning of the ring whereby to obtain the precise effects which the architect and illumination engineers specify.

It is another object of our invention to provide a mounting ring which can interchangeably hold both stationary-type fixtures or rotatable fixtures, both fixtures with stationary parts and fixtures with movable parts, both fixtures with integral reflectors and fixtures with separate reflectors, both fixtures with and fixtures without cones, both fixtures with and fixtures without lenses and, indeed, any all types of fixtures.

It is another object of our invention to provide a mounting ring which, despite its many advantages, retains a prime characteristic that is so necessary for the relamping of high ceiling fixtures, i.e. that of enabling a maintenance man to have access to the lighting fixture with the use of only a single hand, so that he may replace the bulb with his other hand and, if he feels unsteady, brace himself on the fixture or against the ceiling without fear of dropping parts of the fixture.

It is another object of our invention to provide a mounting ring which includes protection against the intrusion of plaster, particularly when the plaster is blown into place, as with the use of an air blast.

It is another object of our invention to provide a mounting ring in which the aperture plate or reflector are uniformly coupled to the mounting ring in such a fashion that uni-manual engagement or disengagement thereof is particularly feasible.

It is another object of our invention to provide a mounting ring which can be employed without change in both wet, i.e., plaster, and dry ceilings, so that even if after installation of the ring on the substructure of the ceiling a change in plan causes a different type of finished ceiling to be employed, a new mounting ring does not have to be utilized.

It is another object of our invention to provide a mounting ring which can be employed with equal facility for installation of fixtures which must be serviced from beneath or above the ceiling, i.e., for both bottom and top access fixtures.

It is another object of our invention to provide a mounting ring which can accommodate building accessories other than lighting fixtures, as for example, loud speaker enclosures, air diffusers, sprinkler heads, electric junction boxes, etc., whereby even after the building is completed, different lighting arrangements can be obtained by installing lighting fixtures in mounting rings which previously accommodated other items, and vice versa.

It is another object of our invention to provide a mounting ring which receives and holds a fixture without the use of attaching means or other like hardware that heretofore have been employed and that have made it necessary to handle small screws and the like, to locate holes or slots in the fixture and to thread screws into tapped holes in a location where space was limited and where, often only one hand could be used.

It is another object of our invention to provide a mounting ring in which a fixture can be rotated about the axis of symmetry of the ring so that, unlike previous rings to which fixtures were bolted or screwed, a fixture can be installed in any position in azimuth within the ring.

It is an ancillary object of our invention to provide a mounting ring which will permit removal therethrough of complete fixtures, even of the fixtures which are considerably larger than the lighting opening in the ceiling.

It is a further ancillary object of our invention to provide a mounting ring of the type last mentioned in which a minimum of metal is visible at the finished ceiling.

It is still a further ancillary object of our invention to provide a mounting ring of the type mentioned in the penultimate object wherein when the lighting fixture is removed it is not necessary to disturb the plaster.

Other objects of our invention in part will be obvious and in part will be pointed out hereinafter.

Our invention accordingly consists in the features of construction, combinations of elements and arrangements of parts which will be exemplified in the devices hereinafter described and of which the scope of application will be indicated in the appended claims.

In the accompanying drawings in which are shown various possible embodiments of our invention, FIG. 1 is a perspective view of a mounting ring constructed in accordance with and embodying our present invention;

FIG. 2 is a top plan view of said ring;

FIGS. 3, 4, 5 and 6 are enlarged sectional views taken substantially along the lines 3—3 4—4 5—5 and 6—6, respectively, of FIG. 2, the same illustrating, respectively, the cross-section of the basic ring, the cross-section of an external boss of T-shaped cross-section and of an internal longitudinal slot, the cross-section of an external longitudinal slot, and a vertical side elevational view of the external boss and of an internal set of longitudinally spaced fixture mounting lugs;

FIG. 7 is a vertical sectional view through a mounting ring as it appears installed in a dry ceiling, and illustrating the same in conjunction with one type of lighting fixture;

FIG. 8 is an exploded fragmentary perspective view showing a mounting clip in conjunction with the cooperating part of the mounting ring, to wit, the external boss;

FIG. 9 is a top plan view of the mounting ring and lighting fixture, showing how the mounting ring is secured to structural elements of a ceiling with the aid of a pair of mounting clips;

FIG. 10 is a perspective view showing a detail of the connection between an end of a supporting bar and a structural element of a ceiling;

FIG. 11 is a fragmentary perspective detail view illustrating the coupling relationship between an aperture plate and a cooperating part of the mounting ring; the aperture plate is illustrated in dot and dash lines in this figure and one type of mounting for the coupling pin is depicted thereon;

FIG. 12 is a fragmentary vertical sectional view through a portion of the mounting ring and an associated lighting fixture, said view illustrating a coupling relationship similar to that shown in FIG. 11, but modified to the extent that a different mounting is used for the coupling pin and the pin is attached to an aperture plate which is functionally integral with a reflector separate from the housing for the lighting fixture;

FIG. 13 is a fragmentary perspective view illustrating the cooperation between a sliding drop hinge for the aperture plate and the internal longitudinal slot of the mounting ring;

FIG. 14 is a fragmentary vertical sectional view through a portion of the mounting ring and an associated lighting fixture, said view illustrating an alternate arrangement for detachably coupling a portion of the lighting fixture to the mounting ring, said arrangement being one in which no relative rotation is experienced between the aperture plate and the mounting ring;

FIG. 15 is a fragmentary vertical sectional view through a portion of the mounting ring and a lighting cone, said view illustrating the connection between said ring and cone;

FIG. 16 is an exploded view of a portion of the mounting ring and of an alternate form of mounting clip;

FIG. 17 is a fragmentary vertical sectional view through a portion of the mounting ring and another lighting fixture, said view illustrating the connection between said ring and a fixture mounting bracket;

FIG. 18 is a vertical sectional view through the mounting ring as it appears when installed in a plaster ceiling, and illustrating the same in conjunction with a different type of lighting fixture;

FIG. 19 is a fragmentary exploded view of a portion of the mounting ring and of an associated portion of a junction box bracket;

FIG. 20 is an exploded fragmentary sectional view showing a supporting strap in conjunction with the cooperating part of the mounting ring, to wit, the external longitudinal slot;

FIG. 21 is an exploded perspective view of the mounting ring and a disposable plaster cover;

FIG. 22 is an axial fragmentary sectional view through the ring and cover as they appear when coupled and before installation of the ring in a wall or ceiling;

FIG. 23 is a vertical sectional view through the mounting ring as it appears installed in a plaster ceiling, and illustrating the same in conjunction with still another type of lighting fixture which can be rotated in azimuth with respect to the mounting ring after installation in order to direct an issuing beam of light in any selected manner;

FIG. 24 is a fragmentary sectional view through a portion of the mounting ring in conjunction with an auxiliary clip which is employed to support from the mounting ring a fixture of the type that is adapted to be relamped from above the ceiling, as for instance, from a catwalk over the ceiling;

FIG. 24A is an enlarged perspective view of the auxiliary clip shown in FIG. 24;

FIG. 25 is a vertical sectional view through the mounting ring as it appears when affiliated with another mounting ring of different size and with a plasterable adaptor ring, all being illustrated in connection with a fragmentarily depicted lighting fixture of a diameter which exceeds that of the opening in the smaller of the mounting rings and is less than that of the opening in the other mounting ring, whereby upon removal of the smaller mounting ring and adaptor ring, the fitting can be withdrawn through the ceiling without breaking plaster;

FIG. 26 is a partially exploded view showing the three rings illustrated in FIG. 25;

FIG. 27 is an enlarged perspective view of the fixture supporting element of the adaptor ring; and FIG. 28 is a partially broken away perspective view of the larger mounting ring and the adaptor ring, and illustrating the quick-disengageable interconnection between these two rings.

Referring now in detail to the drawings, and more particularly to FIGS. 1–6, the reference numeral 30 denotes a mounting ring constructed in accordance with and embodying our present invention. Said ring preferably is made from a non-ferrous material to avoid the use of steel or iron which are prone to rust, particularly when they have had wet plaster or cement in contact therewith. Desirably, the mounting ring is fabricated from a moldable material, that is to say, the mounting ring is cast by the introduction of a hardenable material into a mold cavity in fluid state. We have found that the most satisfactory commercial results are secured where the mounting ring is made by die casting. We can employ either any conventional impact resistant zinc die casting alloys or we may die cast the ring of aluminum or of any conventional aluminum die casting alloy. Although we have obtained superior results where the ring is made by casting with metals, it is within the scope of our invention to cast the ring of a synthetic plastic material, either a thermoplastic resin or a thermosettable resin. For instance, the ring can be made from a high impact resin such as a mixture of polystyrene and a copolymer of butadiene and styrene, or the ring can be molded from a condensation resin, e.g., a urea formaldehyde condensation product. In general, we prefer to make the ring from a die cast metal such as an aluminum die casting alloy because the ring is particularly inexpensive to fabricate in such fashion, because a ring so fabricated can be molded to sufficiently close tolerances for universal use with a plurality of lighting fixtures, because a ring so fashioned is light, and because such a ring can be made comparatively rigid despite its inherently weak shape (large diameter and thin wall).

More particularly, the mounting ring constitutes a thin squat cylindrical sleeve 32 of some certain diameter. A complete line of mounting rings will include sleeves of different diameters, as for example, an eight inch sleeve, a ten inch sleeve, a twelve inch sleeve, etc., the diameters being suitable for trade purposes and being established by the manufacturers or by architects. The sleeve is comparatively shallow in height, being, for example, in the order of an inch and a half long ("length" and "longitudinal" is to be understood to be in a direction parallel to the axis of symmetry of the sleeve), although it is to be understood that this measurement and other measurements which have and will be set forth herein simply are given by way of example and are not to be construed as limitative.

At the lower edge of the sleeve we provide a radially outwardly extending flange 34 and at the peripheral edge of this flange there is disposed a very shallow downwardly extending annular lip 36 (for convenience the ring will be described as it appears when mounted in a ceiling). The lower surface of said lip constitutes an edge which is adapted to act as a plaster ground so that it will be flush with the ceiling line. The flange 34 serves various functions included among which are the stiffening, i.e., rigidifying, and reinforcing, of the thin sleeve 32. Said sleeve further is reinforced, if desired, by slightly thickening its base as can be seen quite clearly in FIG. 3. The sleeve has an upwardly tapering draft to facilitate removal from the mold in which it is die cast.

The mounting ring further includes various adjuncts which are integral with the sleeve and which adapt the ring for universal use with a wide variety of lighting fixtures, under a variety of field uses and in accordance with a variety of local and underwriter codes and regulations. Some of these adjuncts are usable under some circumstances and others under other circumstances. It will be found that for most installations at least two and customarily several of these adjuncts will be employed.

One of the aforesaid adjuncts constitutes a set of identical external bosses 38. There are four such bosses arranged in quadrature, said bosses being disposed on the exterior surface of the sleeve 32. Each boss is of T-shaped horizontal cross-section with a broad radially oriented stem and a thin circumferentially oriented head. The boss runs longitudinally, i.e. in a direction parallel to the axis of symmetry of the sleeve, from the upper surface of the flange 34 to a level well below the upper edge of the sleeve 32. The head, i.e. outer portion, of each boss is spaced radially inwardly from the periphery of the flange 34. Each boss is formed with a longitudinal through bore 40 the upper terminal of which is at the upper surface of the boss and the lower terminal of which is disposed on the lower face of the flange 34. As subsequently will be seen, the bosses 38, including the bores 40 serve, inter alia, as a support for a junction box bracket, as supports for a plasterable adaptor ring, as supports for ceiling mounting clips, as one half of a coupling means for a disposable plaster cover, and as one half of a coupling means for a non-rotatable aperture plate or other non-rotatable part of a lighting fixture.

The second of the aforesaid adjuncts is the flange 34 itself. In addition to stiffening the sleeve, said flange in conjunction with the lip 36 provides a shallow recess for receiving a trim plate, an aperture plate or a similar part of a lighting fixture. The upper surface of the flange 34 also defines an abutment for the bottom of a junction box bracket and of a ceiling mounting clip. This surface furthermore is employed to engage spring detents on trim ring clips.

The third of the aforesaid adjuncts constitutes a set of external longitudinal slots 42 (FIGS. 2 and 5). These slots are defined in part by a top-to-bottom opening in the flange 34 which opening is disposed immediately adjacent the external surface of the sleeve 32, and in part by an open-ended box 44 directly above said opening. The box constitutes a pair of radial side walls integral with the sleeve 32 and the flange 34, and an outer circumferential wall spaced from and parallel to the sleeve 32 and rising from and integral with the flange 34. Said outer wall is provided with a notch 46 to lighten the mounting ring. Each slot 42 thus formed is of substantially rectanguar cross-section, being comparatively broad in a peripheral, i.e., circumferential, direction, and comparatively narrow in a radial direction, so that the slots are adapted to receive a longitudinally extending element of oblong cross-section. A principal function of the external longitudinal slots 42 is to serve as a coupling means for receiving and engaging malleable metal straps that may be utilized as an alternate arrangement for securing the mounting ring 30 to structural elements of a ceiling. Four slots 42 are included, each being spaced midway between adjacent bosses 38.

The fourth of the aforesaid adjuncts constitutes a set of internal longitudinal slots 48. Each slot is defined by a longitudinally extending open-ended rectangular box 50 integrally formed on the inner face of the sleeve 32. The inner wall of the box 50 is formed with a broad longitudinal passageway 52 although this is not essential. The slots 48 are broad in a circumferential direction and narrow in a radial direction. Three equiangularly spaced internal longitudinal slots 48 are included, their angular disposition with respect to the bosses 38 being of no importance. Said slots 48 are adapted to receive leaf spring supports for lighting fixture elements such as cones or reflectors or to receive flat leaves for sliding drop hinges or to act as an upper stop for a bead or a flange at the bottom of a reflector.

The fifth of the aforesaid adjuncts constitutes a set of pairs of longitudinally mismatched lugs 54, 56. Three such pairs of lugs are provided in equiangularly spaced positions around the inner surface of the sleeve 32, each pair of lugs being located midway between each pair of internal longitudinal slots 48. The lugs of each pair are located at different horizontal elevations, the reference numeral 54 indicating the upper lug and the reference numeral 56 the lower lug. Between them the lugs define a clear horizontal space 58 (see FIG. 6). The clear spaces of the several pairs of lugs lie in a common plane perpendicular to the axis of symmetry of the sleeve 32. It may be mentioned that the longitudinally mismatched lugs 54, 56 of each pair are offset from one another in a circumferential direction so that the two lugs of any pair do not overlap circumferentially. This arrangement is employed to simplify die casting of the mounting ring 30. The principal function of the longitudinally mismatched lugs is the provision of the clear spaces 58 which cojointly act as an interrupted internal annular groove for the accommodation of an outwardly extending annular flange or bead of a part of a lighting fixture to be supported by the mounting ring. It will be observed that the under surface of the lower lug 56 is formed with a cam surface 60 (see FIGS. 6 and 11). This surface slopes longitudinally upwardly and radially inwardly in order to constrict the aforesaid annular bead adapted to be introduced into the clear spaces 58 (the interrupted internal annular groove) when said bead is pushed upwardly into the mounting ring from beneath as will be described hereinafter.

The sixth and last of the adjuncts constitutes a set of internal circumferential cams, i.e. shelves, 62 (see FIGS. 2 and 11). Three such shelves are provided, each different shelf preferably being associated, for convenience, with a different one of the lower lugs 56. Each internal shelf 62 in effect comprises a short ramp which extends in a circumferential direction and has a longitudinal rise, the rise of all the shelves being alike. The ramps are inclined to the horizontal at a small angle, e.g. 10°, from their entrance ends 64 to their peaks 66. Immediately above the peaks the shelves fall rapidly to grooves 68. The internal circumferential shelves are provided to act as a simple screwless coupling means and support for an aperture plate or a reflector.

As noted previously the mounting ring with all its adjuncts is made in one piece by a casting operation, preferably a die casting operation, and from a nonferrous metal, aluminum die castings being preferred. It is within the scope of our invention to eliminate any few of the aforesaid six adjuncts but it will be understood that for each adjunct that is absent a function is lost and that therefore in the preferred form of our invention all of said adjuncts are utilized and, in particular, at least all but the third.

To fully appreciate the use and versatile nature of the mounting ring 30 we will describe the manner in which such a mounting ring is employed to hold a variety of lighting fixtures through the medium of various adjuncts and is itself secured by different adjuncts to a ceiling.

In FIGS. 7–11 and 13 the mounting ring 30 has been illustrated in connection with one type of lighting fixture 70 comprising a simple lensed downlight.

The first thing to be considered in connection with these figures is the manner in which the mounting ring is held in place at the ceiling. For this purpose we employ mounting clips 72 (FIGS. 7–10). Two such clips are used which are identical to one another so that a description of one will suffice.

Each mounting clip is fashioned from resilient sheet material, e.g. sheet stainless steel, and in its relaxed shape (shown in FIG. 8) constitutes an elongated base 74 along the opposite longitudinal edges of which are disposed flanges 76. The flanges are at a small angle, e.g. 20°, to the base and extend inwardly therefrom when attached to the mounting ring (see FIG. 9) so that the extreme outer edges of the flanges will engage the external surface of the sleeve 32. Integral with the outer edges of the flanges 76 are broad wings 78. The angles between the wings and flanges is such that the two wings are a parallel and converge in a radially inward direction when the clips are attached to the mounting ring. Therefore the wings will flare away from one another in a radially outward direction. However because the clips are made of resilient material, the wings can be flexed toward one another so that they can be temporarily forced into parallel relationship.

Each wing is provided with a series of longitudinally elongated parallel slots 80 so mutually arranged that the upper and lower edges of each slot except the uppermost slot are slightly below, e.g. one quarter inch below, the upper and lower edges of the next upper slot. Thus where, as illustrated, five slots are provided, the upper and lower edges of the lowermost slot are one inch below the upper and lower edges of the uppermost slot and the differences between the upper and lower edges of the slots are in uniformly graduated steps. All slots are of the same length. The slots 80 in the two wings are so located that when the wings are flexed into parallel relationship the slots in one wing are transversely horizontally registered with the slots in the other wing.

The lengths and widths of the slots 80 in both wings are alike and are selected to nicely and freely pass the transverse cross-section of a supporting bar 82 (see FIGS. 9 and 10) of conventional configuration. By way of example a typical slot will be a little more than five eighths of an inch long and a little more than one eighth of an inch wide.

Each clip includes suitable means to enable the same to be easily and quickly coupled to a mounting ring 30. Such means constitutes a tongue 84 struck outwardly from the material of the base 74 at the lower edge thereof, the tip and sides of the tongue being free of the base and the bottom of the tongue being connected to the base by an offset 86 whereby the tongue is displaced radially outwardly from the base. Said tongue includes an opening 88 therein.

Two clips 72 are engaged with a mounting ring 30 on diametrically opposite sides thereof and with the aid of the adjuncts comprising diametrically opposite external bosses 38. The notch 90 in the base 74 formed by striking out the tongue 84 is slipped over the stem and in back of the head of the associated T-shaped boss 38 until the offset 86 strikes the upper surface of the boss and at the same time the lower edges of the clip flanges 76 abut the upper surface of the sleeve flange 34. At this time the notch is captively held below the head of the boss while the tongue 84 resiliently engages the outer surface of the head of the boss. The boss includes an outwardly opening radial blind bore 92 with which the opening 88 registers when the mounting clip is seated on the boss. The shank of a self-tapping screw 94 is passed through the opening 88 and threadedly engages with the blind bore 82 to securely fix the mounting clip 72 to the sleeve 32. Thus at this stage, the mounting ring will have two mounting clips thereon each with outwardly diverging wings 78.

Now the mounting ring is applied to the structural elements of a ceiling at a desired site. Typically, a ceiling will include parallel angle irons 96 (see FIGS. 9 and 10) between which a fixture is adapted to be located. To attach the wing equipped mounting ring 30 to these angle irons we employ a parallel pair of the supporting bars 82. These are elongated metal, e.g. iron, bars of oblong cross-section; they typically are about one eighth of an inch by five eighths of an inch in section so that they can be slipped through the slots 80. Before the bars are introduced into the slots the wings are manually squeezed to approximately parallel relationship and the bars are axially adjusted in the wings so that the ends of the bars will rest on the angle irons 96 when the mounting ring is properly situated between the angle irons. The ends of the supporting bars 82 are formed with several openings 98 for the purpose of enabling the bars to be fastened to the angle irons with soft iron tie wires 100 (see FIG. 10).

It will be appreciated that by inserting the supporting bars in suitably selected slots 80 the elevation of the mounting ring can be adjusted to enable the lower rim thereof to lie substantially flush with the ceiling line (room side of the ceiling) eventually to be installed.

We have found that the quarter inch adjustment permitted by the wing slots 80 enables a sufficiently fine adjustment to be made for most work; however to enable a more delicate adjustment to be effected when required, we have formed both ends of the supporting bars so that each includes a horizontal notch 102 the depth of which is equal to one-half the step distance between the matching ends of any two adjacent slots 80. More particularly, in the example given, where the slots are stepped one-quarter of an inch, the notch 102 is one-eighth of an inch deep. Accordingly, by turning a pair of mounting bars long edge for long edge the installed height of a mounting ring can be changed by one-eighth of an inch. This permits the height of a mounting ring to be varied in one-eighth inch steps over a full range of one inch.

Attention is called to the fact that after the supporting bars have been inserted in the wings and their axial positions properly adjusted, manual pressure on the wings is released so that the wings spring away from one another and thereby frictionally engage said bars. The pressure of engagement suffices to hold the mounting ring in place permanently.

After the mounting ring has been secured to the structural elements of the building a ceiling 104 is installed in any well known manner, the method of installation not being a part of our invention. In FIG. 7 we have shown a so-called "dry" ceiling, e.g. a plaster board, fiber board or tile ceiling. Said ceiling, as is conventional, is cut out to slightly clear the circumferential outer surface of the previously emplaced mounting ring; however this cut edge is rough and should be covered so as to present a sightly appearance. To this end we provide a trim ring 106 which is a circular ring of proper configuration to cover the lower edge of the annular lip 36 and the rough cut edge of the opening in the dry ceiling. The lower surface of the trim ring may be of any desirable ornamental configuration.

In order to hold the trim ring in place we provide the same with angle clips 108 (see FIG. 7) that are adapted to cooperate with one of the adjuncts, to wit the sleeve flange 34. Each angle clip has a horizontal leg that is secured as by spot welding or riveting to the upper surface of the trim ring and a vertical leg. At least three angle clips are employed and said vertical legs are so mutually located as to lie on a circle of slightly greater radius than that of the annular lip 36. Each vertical leg includes a downwardly and radially inwardly inclined flat spring detent 110, the tips of all the spring detents defining a circle of slightly smaller diameter than that of the annular lip. Hence if the trim ring is held beneath and concentric with the mounting ring and the vertical legs of the angle clips are introduced into the space between the mounting ring and the opening in the dry ceiling and if the trim ring then is pushed upwardly the spring detents 110 will flex outwardly until they reach the upper face of the radially outwardly extending sleeve flange 34. They then will snap radially inwardly and be seated on the top of the flange 34.

The distance from the tips of the spring detents 110 to the upper surface of the trim ring 106 is substantially equal to the height of the annular lip 36 so that when these detents spring inwardly the trim ring is in abutment with the annular lip whereby the angle clips will hold the trim ring flat against the ceiling and against the mounting ring although only a simple pushing action is necessary to secure the same in place.

The downlight lighting fixture 70 includes, interalia, a housing 112 (in the form of a reflector) and an aperture plate 114. Obviously, the fixture may include other parts which are necessary for various purposes but which are not relevant to the present description inasmuch as they do not affect the support of the fixture from the mounting ring. In passing therefore it merely will be noted that the fixture further includes an electric light bulb 116 the base (not shown) of which is inserted in a socket 118 and the latter in turn being supported by the upper end 120 of the housing 112. An angle cap 122 external to the housing is attached to the socket 118 and to the housing as by screws 124. Electricity is supplied to the socket by an armored cable 126 running from the angle cap to a conventional junction box 128. The lighting fixture also includes a lens 130 which is suitably supported from the aperture plate 114 which in this instance thus also serves as a lens ring.

The rim, i.e., lower edge, of the housing 112 includes an outwardly extending circular flange 132 in the form of a rolled bead, i.e. a bead of circular cross-section designed to cooperate with one of the adjuncts, to wit the mismatched lugs. The diameter, and, therefore, the height, of the bead is such that it is slightly larger than the height of the internal interrupted annular groove defined by the clear spaces 58. The outer diameter of the beaded rim of the housing furthermore is such that it is slightly in excess of the diameter of the circle defined by the mismatched lugs 54, 56, the excess being just enough so that when the housing is secured to the mounting ring the bead 132 will be partially received within the clear spaces 58 of the three pairs of mismatched lugs.

The aperture plate 114 has affixed thereto three radially outwardly extending pins 134 for cooperation with an adjunct of the mounting ring, specifically the shelves 62. As illustrated in FIG. 7 the pins are inserted in an upstanding lens supporting flange 136 die cast in one piece with the aperture plate. Alternatively as shown in FIG. 11 similarly located radial pins 138 may be provided on a sheet metal aperture plate 140 which pins are held in place by yokes 142 fastened as by spot welding to the upper surface of the aperture plate. Regardless of which method of attachment is used the pins are located at a level higher than the upper surface of the aperture plate, the distance between the pins and said upper surface of the aperture plate being barely in excess of the distance between the peak 66 of a cam shelf 62 and the lower surface of the radially outwardly extending flange 34 of the mounting ring. Three equiangularly spaced pins are provided so that they will match the number and spacing of the circumferential shelves 62.

To couple the lighting fixture 70 to an already installed mounting ring 30 (the wiring for the fixture previously having been completed) the housing 112 (with the aperture ring not yet attached thereto) is introduced into the lower end of the mounting ring until the beaded flange 132 rests against the cam surfaces 60 of the lower lugs 56. Now the housing is forced upwardly. The sheet metal from which the housing is formed is comparatively light, e.g. 20 gauge, so that only a mild upward force is required for the cam surfaces 60 to constrict the beaded flange 132 radially inwardly enough to enable this flange to clear the lower lugs 56; thereupon they will ride up on the radially inward surfaces of said lugs until the bead reaches the clear spaces 58. Then the bead will resiliently snap out to enter into and engage the mouths of such clear spaces. Thus the housing will be firmly held in place although it can be deliberately dismounted by prying in the beaded flange 132 adjacent one or more lower lugs 56.

After the housing has been installed the aperture plate is coupled to the mounting ring. This is done by holding the aperture plate level and raising it into engagement with or near the lower surface of the flange 34. The plate is turned until pins 134 are located at the entrance ends 64 of the shelves 62. Now the plate is rotated a few degrees more causing the pins to ride up the shelves until they reach and then clear the peaks 66. The plate now can be released to allow the pins to drop into the grooves 68. It is to be noted that since the grooves 68 are immediately adjacent the lower lugs 56 the side surfaces of these lugs prevent the aperture plate from being turned too far. The grooves are deep enough to prevent the plate from being disengaged accidentally after its release; however the aperture plate can be removed by reversing the foregoing procedure. Both the coupling and the uncoupling of the aperture plate can be performed unimanually since the aperture plate only has to be raised and turned slightly. Thereby the handling of small coupling elements such as screws is avoided.

Since downlight fixtures often are mounted in high ceilings and are located in public places we provide an arrangement which with the aid of one of the adjuncts, in this instance an internal longitudinal slot 48, will prevent an aperture plate from being dropped if the same accidentally should be released by an electrician. Referring to FIG. 13 we use a sliding drop hinge 144 to hold the aperture plate. Said drop hinge comprises an elongated flat narrow vertical leaf 146 the lower end of which is provided with a radially inwardly directed tongue 148 having a horizontally elongated slot 150 therein. Threaded through the slot is an axle 152 the opposite ends of which are supported in the vertical arms of a yoke 154 that is attached as by welding to the upper surface of the aperture plate 114. Alternatively, if desired, and as shown in FIG. 7 the arms of the yoke may be integrally formed with the aperture plate.

The leaf 146 is captively and slidably received in one of the internal longitudinal slots 48. That is to say, the box 50 has an internal dimension such as to freely slidably receive the leaf 146. To prevent the leaf from dropping completely through the sleeve the upper end of the leaf includes an outwardly and downwardly inclined tongue 156. The tip of said tongue is designed to engage the upper edge of the box 50 when the drop hinge is in its lowermost position (shown in FIG. 13).

Attention is directed to the fact that the arms of the yoke 154 are spaced apart a distance in excess of the circumferential lengths of the shelves 62 whereby the drop hinge allows the aperture plate to be turned enough for the pins 134 to ride up the circumferentially sloped shelves and be dropped into the grooves 68. Obviously the yoke 154 is mounted on the aperture plate in such an angular position that it will permit the pins 114 to engage the three circumferential shelves.

The junction box 128 is supported from the mounting ring 30 with the aid of a junction box bracket 158 (see FIGS. 9 and 19) and one of the adjuncts of the mounting ring, in particular a boss 38. Said bracket comprises a base 160 consisting of a channel with inturned edges adapted to be telescopically coupled over an external boss 38 90° away from one of the bosses to which a mounting clip 72 is secured. The base is provided with an aperture 162 through which a self-tapping screw 164 is designed to be inserted with the shank of the screw threaded into the affiliated blind bore 92. A cross web 163 limits downward movement of the channel on the boss. The bracket 158 is suitably shaped for attachment to a standard junction box 128. Thus the entire lighting fixture and its associated electric parts are carried by the mounting ring.

It will be appreciated that the lighting fixture 70 can be removed completely from the mounting ring by first lifting and turning and then releasing the aperture plate, then prying loose and dropping the reflector and thereafter disconnecting the armored cable 126 from the junction box. Thereupon a different electric fixture having a casing of the same diameter or any other type of fixture as, for instance, an air conditioning outlet with a similar dimensioned casing and a beaded lower edge, can be secured to the mounting ring.

In FIG. 12 we have shown an alternate type of lighting fixture 166 carried by the mounting ring 30. Unlike the fixture 70 the fixture 166 has a cylindrical casing 168 in lieu of reflector type housing 112 and said fixture is provided with a separate internal reflector 170 supported by an aperture plate 172. The lower rim, i.e. mouth, of the casing 168 is formed with a radially outwardly extending circular flange 174. Said flange 174 has a lesser height than the beaded flange 132 of the lighting fixture 70; hence the height of the flange 174 is less than the height of the clear space 58 between each pair of mismatched lugs 54, 56. Accordingly in the fixture 166 the casing 168 is supported by the lug adjuncts, i.e. by simply resting on the upper surface of the three lower lugs 56. However the method of coupling and uncoupling the casing to the mounting ring is the same as for the reflector type housing 112.

Instead of the pins 134 or 138 the sheet metal aperture plate 172 is provided with right angle pins 176 each having a vertical leg secured to the aperture plate and a horizontal leg which extends radially outwardly and occupies the same physical position as described above for the pins 134 and 138. Accordingly the aperture plate 172 is detachably coupled to the mounting plate ring 30 in the same manner as the aperture plate 114, i.e. through the assistance of the shelf adjuncts. There is this distinction, nevertheless, that in the case of the lighting fixture 70 the aperture plate only carries a lens 130 and a conical hood 131 whereas the aperture plate 172 carries a reflector 170. It will be appreciated that the foregoing difference applies only to the light distribution of the fixtures and from this some idea of the versatility of the mounting ring will be understood. That is to say the same mounting ring is capable of having coupled thereto with the cooperation of the adjuncts two entirely different types of fixtures each of which is characterized by the presence of a radially outwardly extending circumferential flange for detachable coupling with the pairs of mismatched lugs and radially outwardly extending pins for detachable coupling with the sundry circumferential shelves 62.

It may be desirable with some fixtures to omit the radially outwardly extending pins and it is for this purpose, among others, that the through bores 40 in the boss adjuncts are provided. A lighting fixture 178 of this type is illustrated in FIG. 14. Said fixture has a cylindrical outer casing 180 with a radially outwardly extending circumferential flange 182 designed to engage the mismatched lugs in the same fashion as the flange 174 i.e. so that the flange and casing can be rotated in azimuth. As just noted there are no radially outwardly extending pins such as the pins 134, 138 or 176. In lieu thereof we provide a set of self-tapping screws 184 the shanks of which are adapted to be inserted through openings in the sheet metal aperture plate 186 and to be threadedly engaged in the longitudinal bores 40. An annular gasket 188 is interposed between the undersurface of the flange 34 and the upper surface of the aperture plate. In said fixture 178 the aperture plate carries a reflector or lighting cone 190. Said aperture plate is, moreover, coupled to the mounting ring by means of a sliding drop hinge 192 like the hinge 144 hereinabove described in detail.

It will be understood that with the arrangement shown in FIG. 14 no angular motion needs to take place between the aperture plate and the mounting ring during either the coupling or uncoupling of said aperture plate.

In FIG. 15 we have shown the mounting ring 30 used to support a lighting cone 194 provided with an outturned lower flange 196 which functions as an aperture plate. The lighting fixture with which the lighting cone is used has not been shown. Such fixture can be secured to the mounting means in any one of the sundry fashions hereinabove or hereinafter described, the only feature which it is desired to describe at this point being the connection between the lighting cone and adjuncts of the mounting ring. The lighting cone is held by a plurality, to wit, three, leaf springs 198 of which only one is shown in FIG. 15. The lower vertical end of said leaf spring is inserted through an internal longitudinal slot 48 the extent of insertion being limited by a radially outwardly extending and downwardly sloped tongue 200 having its base in one piece with the spring 198. Above its lower end the spring is inclined upwardly and radially inwardly and terminates at its upper end in an angularly outwardly inclined finger 202 designed to engage the undersurface of the outwardly turned top edge 204 of the lighting cone 194. The leaf springs 198 are installed in the mounting ring after the mounting ring has been secured in place in the ceiling structure. The lighting cone is coupled simply by pushing the same upwardly so as to force all of the springs 198 outwardly until the fingers 202 clear the outwardly turned edge and snap under the same. The lighting cone can be removed by reaching into the cone to grasp the upper rim and then pulling the same down. The edge 204 will cam the fingers 202 outwardly. However the weight of the lighting cone is so slight that the cone will not be disengaged accidentally.

As mentioned previously, various methods can be employed for attaching the mounting ring 30 to the ceiling supporting structure with the assistance of the adjuncts. One such way, to wit, through the use of the boss adjuncts, the mounting clips 72 and the supporting bars 82 already has been described. In FIGS. 16 and 20 we have shown two alternate methods which cooperate with certain of the six adjuncts.

Referring first to FIG. 16, a modified form of mounting clip 206 has been illustrated. Said clip has a lower longitudinally extending end 208 provided with a vertical string of openings 210 through any one of which the shank of a self-tapping screw 212 may be inserted and threaded into the blind bore 92 of an external boss 38. The series of openings 210 enable the vertical location of the mounting ring to be adjusted. Directly above its lower end 208 the mounting clip 206 is provided with a series of radially outwardly extending steps 214 which terminate a longitudinally extending leg 216 that is apertured as at 218. The upper tip of the leg includes a radially inwardly directed flange 220 formed with a transverse slot 222. The leg and flange are adapted to be secured to the structural elements of the ceiling as with wire, nails or screws. The mounting clip 206, unlike the mounting clip 72, need not be resilient and therefore is not intended to be frictionally engaged with mounting bars such as the bars 82; however, if desired, said clip 206 can be bolted through either the aperture 218 or the slot 222 to such mounting bars which in turn are connected to structural elements of the ceiling. It will be appreciated, of course, that at least two diametrically disposed mounting clips 206 are used in connection with two diametrically opposed bosses 38.

A second alternate method of attaching the mounting ring 30 to ceiling elements is illustrated in FIG. 20. Pursuant thereto we provide a metal strap 224 such as ordinary pipe strap, that is to say a strap of malleable (hand deformable) material which includes a longitudinal series of apertures 226. The external longitudinal slots 42 are dimensioned to nicely slidably receive such straps whereby the straps can be inserted lengthwise into the boxes 44. Said straps include an upper pair 228 and a lower pair 230 of tines located in horizontal registry on opposed long edges of the strap 226. The tines are struck out sufficiently far so that they will not pass freely through the box 44. However despite the fact that the metal of the straps is soft there is sufficient resiliency to enable the tines to be flexed inwardly as they are forced through the box and to spring out slightly after they have cleared the box. Each of the tines is struck from the strap in such a fashion as to provide a lower horizontal edge for the upper tines and an upper horizontal edge for the lower tines. The space between these upper and lower horizontal edges is slightly in excess of the height of the external longitudinal slots 42. Accordingly when it is desired to fasten a mounting ring 30 to structural elements of a ceiling with the use of the straps 224, the lower ends of two straps are slid into diametrically opposite boxes 44 until the lower pairs of tines clear the undersurface of the flange 34. This will occur slightly before the lower horizontal edges of the upper pairs of tines reaches the tops of the boxes 44. Thereby the straps are captively held in the boxes. Now the two straps with which the mounting ring is provided are wrapped about, wired, screwed, nailed, stapled or bolted to nearby structural elements of the ceiling.

FIG. 17 illustrates a method of connecting the casing or housing of a fixture to the mounting ring 30 with the aid of an adjunct other than the mismatched lugs. In this figure the reference numeral 232 denotes a lighting fixture. The particular fixture shown is one in which a casing 234 is supported so as to turn about a horizontal axis several inches above the ceiling line. To permit this to be accomplished the lighting fixture includes a pair of brackets 236 of which only one has been illustrated. Each bracket includes an upper L-shaped strap iron 238 and a lower L-shaped strap 240. The upper end of the vertical leg of the upper strap 238 is rotatably connected, as by a horizontal pin 242, to the casing 234 to provide the desired horizontal oscillation. The horizontal leg of the upper strap 238 is adjustably connected as by a bolt 244 and wing nut 246 to the horizontal leg of the lower strap 240, one of these horizontal legs having an opening just large enough to nicely pass the shank of the bolt 244 and the other a slot to accommodate the shank of the bolt thereby enabling the vertical legs of the two straps to have their spacing adjusted to a proper distance to accommodate the casing 234.

The vertical leg of the lower L-shaped strap 240 is coupled to the mounting ring 30 through one of the adjuncts. More particularly, said leg is suitably dimensioned for a nice sliding fit in an external longitudinal slot 42. The leg is formed with a tapped aperture in which a bolt 248 is screwed the shank of the bolt being located in the indent notch 46 whereby when the bolt abuts the base of the notch the vertical position of the bracket is fixed. It may be noted that the lighting cone 194 shown in FIG. 15 often is employed in connection with a lighting fixture such as the fixture 232.

In FIG. 18 we have illustrated a lighting fixture 250 of a different type but which yet is readily capable of being carried by the mounting ring 30 with the cooperation of certain of the adjuncts. In said lighting fixture a ceiling plate 252 is employed instead of an aperture plate, the essential difference in the connection being that a smaller central opening 254 is provided. It will be observed that said ceiling plate is connected to the mounting ring by pins 138 held in place by yokes 142 such as were described with respect to FIG. 11. It also will be observed that in this figure we have shown the junction box 128 secured to the mounting ring by a junction box bracket 158 and a boss 38. The break away section through the bracket in said figure constitutes a further illustration of the bracket which already was described with reference to FIG. 19.

Furthermore in said FIG. 18 we have illustrated the mounting ring set in place in a plaster ceiling rather than a dry ceiling. Attention is called to the fact that no trim ring has to be utilized since the plaster is floated to the level of the lip 36.

We have mentioned before that it is known at the present time to deliver plaster to ceilings with the aid of mechanical equipment which deposits plaster on the ceiling far more rapidly than by hand. For example it is now the practice in certain circumstances to blow particles of wet plaster, either with or without a filler such as asbestos fibers, onto a ceiling. In such cases the deposit of the plaster can not be closely controlled and, moreover, the plaster tends to splatter. The mounting rings 30 are installed before the plaster is deposited; therefore when plaster is blown onto a ceiling this semisolid moving material will tend to flow into the opening of the mounting ring from which it must be scraped or subsequently chipped off. Still further, if a fixture already has been installed in the mounting ring the plaster may harm the fixture, particularly if the fixture has any highly finished surfaces that will be harmed by an alkaline or wet substance. To prevent this from occurring we provide in accordance with a preferred form of our invention a disposable plaster cover 256 which is shown in FIGS. 21 and 22 and which is held in place with the assistance of an adjunct, in this case the bores 40 in the bosses 38. Said cover may be of any inexpensive flat sheet material, a suitable substance being paper board or chip board. The plaster cover has a thickness approximately equal to the height of the annular lip 36 and has a configuration which matches that of the area enclosed by the lip. Customarily this area will be circular so that the disposable cover will be circular and it will completely fill the shallow well defined by the flange 34 and the lip 36.

Means inclusive of an adjunct furthermore is included to detachably secure the disposable cover to the mounting ring. Such means may comprise, for example, a series of openings 258 in the cover adjacent the periphery thereof and positioned so that they can be registered with the through bores 40 provided in the external bosses 38. These bores open into the lower surface of the flange 34. The detachable securing means further includes push pins 260. Four such pins are used, one for each of the four openings 258 and four bores 40 in the four external bosses 38. The pins include heads and resilient split shanks which in idle condition are slightly broader than the bores. Thus when the shanks are pushed through the openings 258 and into the bores 40 they will frictionally engage the walls of such bores to hold the disposable plaster cover in place in a position in which it covers the wide central opening of the mounting ring. Accordingly so long as the cover is in place, plaster can be sprayed all over the ceiling in the vicinity of the ring and even over the cover without fear of blowing plaster into the ring or into a fixture supported thereby.

As soon as the plastering operation is finished, or at some subsequent time, the disposable plaster cover can be removed. To assist in such removal we may include an integral knockout section 262 which is connected to the balance of the cover along a weakened zone 264 for example a zone where the material of the cover has been partly slitted (perforated). Thus to break away the section 262 it only is necessary to press inwardly against the same. This will leave a knockout opening through which a person's hand can be inserted to grasp the plaster cover and pull the same downwardly free of the mounting ring 30 without the necessity of individually removing each of the push pins 260.

It will be apparent from the description thus far given that the mounting ring 30 by virtue of the adjuncts we have provided is capable of supporting an extremely wide range of different types of fixtures. However, all of the fixtures thus far illustrated and described have the aperture plate or the ceiling plate fixed, that is to say the aperture plate or the trim ring in operative condition could experience no adjustments in azimuth although they could be dismounted. It is within the scope of our invention to employ fixtures in which the aperture rings or trim plates can be angularly adjusted about a longitudinal axis and such a fixture 226 has been illustrated in FIG. 23. This is the type of lighting fixture in which the beam of light issuing from the ceiling is at an angle to the vertical and therefore it is desirable for the fixture to be rotatable about a vertical axis in order to direct the beam of light upon any desired spot or object.

The fixture 266 includes a cylindrical casing 268 having a narrow (in height) radially outwardly extending circular flange 270 similar to the flange 174 illustrated in FIG. 12. This flange is adapted to be received in the clear spaces 58 with sufficient longitudinal freedom to allow the casing to be turned about a vertical axis with respect to the mounting ring. The casing supports within it a reflector type lamp bulb 272 the axis of symmetry 274 of which is inclined to the vertical. Light issuing from the bulb is directed downwardly at an angle to the vertical by an asymmetrical reflector 276 carried on a bracket 278 affixed to the wall of the casing 268. Thus the light leaving the lighting fixture is at an angle to the vertical.

The center of the fixture is blocked by an obstruction 280 affixed to the upper surface of a sheet metal aperture plate 282 having an asymmetrical light passing opening 284 located beneath the reflector 276. If the aperture plate were directly connected to the mounting ring by an adjunct in any of the manners heretofore described, e.g. by screws in the bores 40 or by pins engaging the circumferential shelves 62 the aperture plate could not be turned to vary the position of its asymmetrical opening 284 when the asymmetrical reflector 276 and asymmetrically disposed bulb 272 were turned along with the casing 268 about a vertical axis with the flange 272 held in the clear spaces 58. Accordingly said aperture plate is not connected directly to the mounting ring but is carried by the casing 268. To effect this connection we employ a series of, e.g., three, permanent magnetic catches 286 cooperating with ferromagnetic armature plates 288. The catches are fast on the casing 268 and the soft iron armatures 288 are secured to the upper surface of the aperture plate. Accordingly, the aperture plate will turn with the casing. A drop leaf hinge 290 connects the aperture plate 282 to the casing 268 instead of to the mounting ring 30 whereby when the aperture plate is lowered for relamping it cannot be accidentally dropped.

In the various fixtures described hereinabove, the changing of lamps, i.e., relamping, is intended to be carried out by a maintenance man who obtains access to the fixture from the space below the ceiling, in other words, who reaches into the fixture from the room. Our invention contemplates the further utilization of the mounting ring 30, without change, in connection with the type of fixture which is designed to be relamped from above the ceiling, such fixtures being located in buildings in which there is a space above the ceiling through which an electrician can move for servicing the fixtures. With such fixtures it is necessary for the fixture casing to be so supported that it can be lifted up whereby to enable the electrician to reach into the fixture from above and replace the lamp.

In FIGS. 24 and 24A we have illustrated our mounting ring 30 used through employment of certain of its adjuncts to support a lighting fixture 292 which is designed for above-the-ceiling relamping. The mounting ring 30 is secured in the ceiling in any one of the manners heretofore described as with the aid of mounting clips 72. An aperture plate 294 is detachably connected to the mounting ring with yoke supported pins 296 that engage the circumferential shelves 62. Said plate also is connected to the mounting ring 30 with a sliding drop hinge 298 that rides in an internal longitudinal slot 48. A collar 300 is secured to the aperture plate, as by spot welding, in a position concentric with the opening in said plate and so that it extends upwardly away from the plate. The radius of the collar is approximately equal to the radial distance from the center of the aperture plate to the yoke which supports the pins 296.

In order to enable the mounting ring to be used for supporting the top access lighting fixture 292 which is adapted to be relamped from a catwalk above the ceiling we include a set of, e.g. four, top access clips 302. Such clips may be formed from sheet metal or may be die cast and are of roughly S-shaped configuration. Each clip includes a pair of arms 304, 306 connected by a base 308. Said arms and base form a downwardly facing U-shaped portion adapted to straddle the upper edge of the cylindrical sleeve 32. The arm 306 is located on the outer side of the sleeve and the arm 304 on the inner side of the sleeve. The base 308 is above the top edge of the sleeve. The horizontal level of each clip 302 may be fixed by having the base 308 rest on the top edge of the sleeve; however we prefer to have each arm 306 received in a different external longitudinal slot 42, downward movement of said arm being checked by tines 310 struck out from the material of the arm 306 in a manner similar to the tines 228. For a reason which soon will be apparent, in the preferred form of our invention the base 308 is inclined downwardly and radially outwardly from the upper end of the arm 304.

Each clip 302 further includes a third arm 312 connected to the lower end of the arm 304 by a second base 314. The arms 304 and 312 together with the base 314 form a second upwardly facing U-shaped portions. A screw 316 having a knurled manipulating head passes through registered openings in the slanted base 308 and vertical arm 304 so that the tip of the screw projects into the second U-shaped portion a short distance above the base 314. Associated with the opening in the base 308 are depressed tongues 318 that defined an interrupted screw thread adapted to cooperate with the threads on the screw 316 so that by selectively turning said screw its tip may be moved either toward and away from the base 314 and radially inwardly or outwardly, this being due to the inclination of said screw and of the base 308.

The lighting fixture 292 includes a cylindrical casing 320 having a lower rim which is of the proper size to be freely received in the spaces between the arms 304, 312 of the top access clips 302. The casing is made fast by tightening the screws 316. Thereby when it is desired to relamp the fixture the screws 316 are loosened by a worker on the catwalks above the ceiling, the casing 320 is lifted and the old lamp replaced.

Some localities have electrical codes which require that above-the-ceiling fixtures be entirely removable through the ceiling, as for inspection or fixture replacement. This is particularly troublesome where the casing for a fixture is larger than the mounting ring as sometimes is the case in order to obtain some desired lighting effect. However our novel mounting ring 30 is capable of use even under such circumstances. An arrangement for this purpose is illustrated in FIGS. 25–28. Instead of using a single mounting ring, however, in this arrangement we employ two concentric mounting rings. One is a small diameter ring 30 and the other is a large diameter ring 30', these rings being connected by an adaptor ring 322. The two mounting rings are identical with one another and each includes all six of the adjuncts heretofore mentioned. The central through opening of the small diameter ring 30 is considerably smaller than the maximum diameter of the lighting fixture 324 which is to be mounted above the ceiling. However the diameter of the central opening through the large ring 30' exceeds the maximum diameter of the fixture 324.

The large diameter mounting ring 30' is secured to the ceiling structure with the flange 34' uppermost as best is seen in FIG. 25 so that the circular edge of the sleeve 32' which is shown uppermost in its normal FIG. 1 position is, in the inverted position of the ring 30' shown in FIG. 25, lowermost and flush with the ceiling. The ring 30' is held in position with the aid of any one of its adjuncts, for example, with the assistance of the external longitudinal slots 42' through which soft metal straps 326 similar to the metal straps 224 are threaded, the straps being fixed in position with tines 327 similar to the tines 226, 228. Also, if desired, mounting clips can be employed similar to the mounting clips 72 but in such event, due to the inverted position of the mounting ring 30', the mounting clips would include a retroverted portion for engaging the external bosses (not shown) so as to locate the resilient flaring wings of the mounting clips, and indeed all portions of the mounting clips, above the ceiling line.

The smaller mounting ring 30 is concentrically disposed within the mounting ring 30' and is in a normal position such as shown in FIG. 1, i.e. with the lip 36 lowermost and at the ceiling line. The two rings are detachably coupled to one another through the medium of the adaptor ring 322, this ring preferably being fabricated of the same material as the rings 30, 30' that is to say, die cast, desirably from an aluminum die casting alloy.

For convenience in removing the lighting fixture 324, the adaptor ring is more securely attached to the smaller mounting ring 30 that it is to the larger mounting ring 30', the latter attachment being one which is capable of quick detachment to facilitate dropping of the lighting fixture.

More particularly the adaptor ring 322 constitutes a generally flat circular plate 328 which may be strengthened by radial reinforcing ribs 330. At its outer periphery the plate 328 is formed with a depending flange 332 which is interrupted at regular intervals by upwardly facing recesses 334. Six such recesses are provided spaced 60° apart. Three of the recesses are located and dimensioned to snugly receive the internal rectangular boxes 50' of the large diameter mounting ring 30'. The remaining three recesses 334 are positioned and dimensioned to snugly receive the lugs 54' of the ring 30', it being observed that these are the lugs which are uppermost in the FIG. 1 position of the mounting ring but which now are lowermost due to the inverted position of the mounting ring. The bases of the recesses 334 are so located that when they are abutted by the boxes 50' and lugs 54' the lower edge of the flange 332 will be flush with the lower edge of the inverted ring 30' and therefore flush with the ceiling line (see FIG. 25).

The flat plate 328 is formed with a large large central aperture designed to snugly receive the sleeve 32 of a small diameter mounting ring 30. Adjacent this aperture the flat plate is formed with a downwardly facing raised socket 336 the base 338 of which is above the general level of the plate 328. The radial breadth of the socket is equal to the radial dimensions of the external bosses 38 whereby the bosses of the small ring 30 are adapted to be received within the socket. The elevation of the socket 336 is such that when the top surfaces of the bosses 38 abut the socket base 338 the lower edge of the lip 36 will be flush with the ceiling line. Said base 338 is formed with four apertures for the reception of self-tapping screws 340 the shanks of which are threaded into the longitudinal bores 40 provided in the bosses 38. When these screws are in position the adaptor plate is rigidly secured to the small diameter mounting ring 30.

To detachably couple the adaptor plate to the large diameter ring 30' we provide a plurality, e.g. three, slide latches 342. Each of these comprises an elongated straight body 344 which rests on the top surface of the flat plate 328 and is radially oriented. The length of the body is slightly less than the radial distance between the socket 336 and the recesses 334, each of said latches being associated with a different one of the recesses and radially aligned therewith. Suitable means is included to mount each latch so as to permit limited radial movement thereof. Such means comprises, firstly, a bail-shaped strap 346 projecting from the upper surface of the plate 328 so as to form a slot therebeneath and, secondly, a slot 348 in an upstanding flange 350 which is spaced inwardly from the periphery of the plate 328. The slide latch is translatable between a retracted position (FIG. 28) in which the outer tip of the latch exposes the upper open mouth of the associated recess 334 and an extended position (FIG. 25) in which said tip covers and thereby blocks the mouth of the recess. For the purpose of manipulation each slide latch includes an elevated manipulating portion 352. This portion is upwardly offset to lie above the level of the upper edge of the small diameter mounting ring 30.

The two mounting rings and the adaptor ring are shown in coupled relationship in FIG. 25. At this time the boxes 50' and lugs 54' are fully received in the notches 334, the then upper surfaces of said boxes being substantially flush with the upper surface of the flat plate 328. The slide latches are in their extended positions in which the outer tips of the latches block the upper edges of the recesses 334 and rest upon the boxes 50' so as to captively hold them in the recesses. To uncouple the adaptor ring from the outer mounting ring it merely is necessary to draw all three slide latches radially inwardly and pull down on the mounting ring.

The large diameter lighting fixture 324 includes a cylindrical casing 354 larger than the opening in the small mounting ring 30 but smaller than the opening of the large mounting ring 30'. The adaptor plate is provided with suitable means for engaging this casing so that, through the adaptor ring, the two mounting rings may serve to hold the lighting fixture in place above the ceiling. The means for attaching the casing 354 to the adaptor ring preferably is similar to the means utilized for attaching the casing of any lighting fixture to the mounting ring 30 so that a uniformity among the various fixtures usable with our mounting rings may be obtained. To this end the adaptor plate includes several sets of mismatched lugs which are best shown in FIGS. 25 and 27. Each set of lugs comprises an upper lug 356 extending radially inwardly away from the flange 350 and having its lower surface at the level of the upper edge of said flange and a pair of lower lugs 358 one on each different side of the lug 356. Thereby a clear space 360 is formed between the upper and lower lugs which is similar to the clear space 58. This clear space is horizontal and faces radially inwardly from the flange 350. Said space is disposed at a level above the upper surface of the flat plate 328. For convenience in die casting, the two lower lugs 358 are separated from one another by an opening 362. The radially inward side surface of the upper lug 356 is formed with a ramp or cam 364 that slopes upwardly and radially outwardly and thereby is similar to the cam surface 60.

The lower rim of the casing 354 has an outwardly extending annular bead 366 the outer diameter of which is slightly greater than the diameter of the circle defined by the three upper lugs 356. Thereby to couple the fixture 324 to the adaptor plate the casing 354 is centered above the plate and is pulled or pressed downwardly. This causes the bead 366 to ride down the cams 364 so as to constrict the lower rim of the casing and permit it to clear the three upper lugs 356. As soon as these lugs are passed the bead will spring outwardly into the clear spaces 360 where it will be caught between the three sets of upper and lower mismatched lugs.

The lighting fixture 324 may be of the type which employs a lighting cone 368 and in such event the cone may be held in place with leaf springs 370 similar to the leaf springs 198 shown in FIG. 15. The out-turned lower flange 372 of the lighting cone 368 is disposed to lie flush with the ceiling line being received in the shallow socket provided by the flange 34 and lip 36 of the small mounting ring.

It will be observed that when the adaptor ring is securely attached to the small diameter mounting ring 30 these two rings together form a shallow annular downwardly facing receptacle the outer side wall of which constitutes the flange 332, the inner side wall of which constitutes the sleeve 32 and the inverted base of which constitutes the flat plate 328. This receptacle is adapted to be filled with plaster having the same appearance as the plaster of the ceiling so that when the adaptor ring is in place the plaster contained therein will appear to be a continuation of the plaster of the ceiling, the narrow metal gap formed by the sleeve 32' of the large diameter mounting ring and the edge of the flange 332 being unnoticeable. The plaster thus contained will be permanently attached to the adaptor ring and will be lowered away from the ceiling when a fixture is to be removed whereby it is unnecessary to break away any plaster and thereafter repatch the same. To facilitate the anchoring of the plaster in the plaster ring we may include an annulus 394 of Z-shaped cross-section located within the receptacle above described and fastened as by rivets 396 to the plate 328.

It thus will be seen that we have provided a mounting ring and method of using the same which achieve the several objects of our invention and which are well adapted to meet the conditions of practical use.

As various possible embodiments might be made of the above invention, and as various changes might be made in the embodiments set forth, it is to be understood that all matter herein set forth or shown in the accompanying drawings is to be interpreted as illustrative and not in a limiting sense.

Having thus described our invention, we claim as new and desire to secure by Letters Patent:

1. A fixture mounting ring comprising: a squat tubular circular sleeve defining a large central opening, said sleeve having at the lower end only thereof a radially outwardly extending flange from the periphery of which an annular downwardly extending short lip depends, a set of externally located bosses protruding radially outwardly from the sleeve, said bosses being of T-shaped cross-section and running vertically and upwardly away from the flange, said sleeve having radially outwardly protruding open-ended boxes defining a set of external vertical slots and radially inwardly protruding open-ended boxes defining a set of internal vertical slots, plural pairs of lugs projecting radially inwardly from the sleeve, the lugs of each pair being situated at different vertical locations so as to define a radially inwardly opening clear space therebetween, all of said spaces being at the same horizontal level, the lower lug of each pair having a downwardly facing cam surface remote from the clear space for constricting an end of a tubular circular casing of a fixture inserted in the ring and urged against said lugs so as to reduce the diameter of said end of the casing to permit it to enter into the clear spaces between the pairs of lugs, and plural circumferentially extending angularly spaced shelves protruding radially inwardly from the sleeve at the same horizontal level, each of said shelves having an indentation and a stop on its upper surface.

2. A fixture mounting ring comprising: a squat tubular circular sleeve defining a large central opening, said sleeve having at the lower end only thereof a radially outwardly extending flange from the periphery of which an annular downwardly extending short lip depends, a set of externally located bosses protruding radially outwardly from the sleeve, said bosses being of T-shaped cross-section and running vertically and upwardly away from the flange, said sleeve having radially inwardly protruding open-ended boxes defining a set of internal vertical slots, plural pairs of lugs projecting radially inwardly from the sleeve, the lugs of each pair being situated at different vertical locations so as to define a radially inwardly opening clear space therebetween, all of said spaces being at the same horizontal level, the lower lug of each pair having a downwardly facing cam surface remote from the clear space for constricting an end of a tubular circular casing of a fixture inserted in the ring and urged against said lugs so as to reduce the diameter of said end of the casing to permit it to enter into the clear spaces between the pairs of lugs, and plural circumferentially extending angularly spaced shelves protruding radially inwardly from the sleeve at the same horizontal level, each of said shelves having an indentation and a stop on its upper surface.

3. A fixture mounting ring comprising: a squat tubular circular sleeve defining a large central opening, said sleeve having at the lower end only thereof a radially outwardly extending flange from the periphery of which an annular downwardly extending short lip depends, a set of externally located bosses protruding radially outwardly from the sleeve, said bosses being of T-shaped cross-section and running vertically and upwardly away from the flange, plural pairs of lugs projecting radially inwardly from the sleeve, the lugs of each pair being situated at different vertical locations so as to define a radially inwardly opening clear space therebetween, all of said spaces being at the same horizontal level, the lower lug of each pair having a downwardly facing cam surface remote from the clear space for constricting an end of a tubular circular casing of a fixture inserted in the ring and urged against said lugs so as to reduce the diameter of said end of the casing to permit it to enter into the clear spaces between the pairs of lugs, and plural circumferentially extending angularly spaced shelves protruding radially inwardly from the sleeve at the same horizontal level, each of said shelves having an indentation and a stop on its upper surface.

4. A fixture mounting ring comprising: a squat tubular circular sleeve defining a large central opening, said sleeve having at the lower end only thereof a radially outwardly extending flange from the periphery of which an annular downwardly extending short lip depends, a set of externally located bosses protruding radially outwardly from the sleeve, said bosses being of T-shaped cross-section and running vertically and upwardly away from the flange, and plural pairs of lugs projecting radially inwardly from the sleeve, the lugs of each pair being situated at different vertical locations so as to define a radially inwardly opening clear space therebetween, all of said spaces being at the same horizontal level, the lower lug of each pair having a downwardly facing cam surface remote from the clear space for constricting an end of a tubular circular casing of a fixture inserted in the ring and urged against said lugs so as to reduce the diameter of said end of the casing to permit it to enter into the clear spaces between the pairs of lugs.

5. A fixture mounting ring comprising: a squat tubular circular sleeve defining a large central opening, said sleeve having at the lower end only thereof a radially outwardly extending flange from the periphery of which an annular downwardly extending short lip depends, and plural pairs of lugs projecting radially inwardly from the sleeve, the lugs of each pair being situated at different vertical locations so as to define a radially inwardly opening clear space therebetween, all of said spaces being at the same horizontal level, the lower lug of each pair having a downwardly facing cam surface remote from the clear space for constricting an end of a tubular circular casing of a fixture inserted in the ring and urged against said lugs so as to reduce the diameter of said end of the casing to permit it to enter into the clear spaces between the pairs of lugs.

6. A fixture mounting ring comprising: a squat tubular circular sleeve defining a large central opening, and plural pairs of lugs projecting radially inwardly from the sleeve, the lugs of each pair being situated at different vertical locations so as to define a radially inwardly opening clear space therebetween, all of said spaces being at the same horizontal level, the lower lug of each pair having a downwardly facing cam surface remote from the clear space for constricting an end of a tubular circular casing of a fixture inserted in the ring and urged against said lugs so as to reduce the diameter of said end of the casing to permit it to enter into the clear spaces between the pairs of lugs.

7. A fixture mounting ring comprising: a squat tubular circular sleeve defining a large central opening, said sleeve having at the lower end only thereof a radially outwardly extending flange from the periphery of which an annular downwardly extending short lip depends, and a set of externally located bosses protruding radially outwardly from the sleeve, said bosses being of T-shaped cross-section and running vertically and upwardly away from the flange.

8. A fixture mounting ring comprising: a squat tubular circular sleeve defining a large central opening, said sleeve having at the lower end only thereof a radially outwardly extending flange from the periphery of which an annular downwardly extending short lip depends, and plural circumferentially extending angularly spaced shelves protruding radially inwardly from the sleeve at the same horizontal level, each of said shelves having an indentation and a stop on its upper surface.

9. A fixture mounting die cast ring comprising: a squat tubular circular sleeve defining a large central opening, said sleeve having at the lower end only thereof a radially outwardly extending flange from the periphery of which an annular downwardly extending short lip depends, a set of externally located bosses protruding radially outwardly from the sleeve, said bosses being of T-shaped cross-section and running vertically and upwardly away from the flange, plural pairs of lugs projecting radially inwardly from the sleeve, the lugs of each pair being situated at different vertical locations so as to define a radially inwardly opening clear space therebetween, all of said spaces being at the same horizontal level, the lower lug of each pair having a downwardly facing cam surface remote from the clear space for constricting an end of a tubular circular casing of a fixture inserted in the ring and urged against said lugs so as to reduce the diameter of said end of the casing to permit it to enter into the clear spaces between the pairs of lugs, and plural circumferentially extending angularly spaced shelves protruding radially inwardly from the sleeve at the same horizontal level, each of said shelves having an indentation and a stop on its upper surface.

10. A fixture mounting aluminum-alloy die case ring comprising: a squat tubular circular sleeve defining a large central opening, said sleeve having at the lower end only thereof a radially outwardly extending flange from the periphery of which an annular downwardly extending short lip depends, a set of externally located bosses protruding radially outwardly from the sleeve, said bosses being of T-shaped cross-section and running vertically and upwardly away from the flange, plural pairs of lugs projecting radially inwardly from the sleeve, the lugs of each pair being situated at different vertical locations so as to define a radially inwardly opening clear space therebetween, all of said spaces being at the same horizontal level, the lower lug of each pair having a downwardly facing cam surface remote from the clear space for constricting an end of a tubular circular casing of a fixture inserted in the ring and urged against said lugs so as to reduce the diameter of said end of the casing to permit it to enter into the clear spaces between the pairs of lugs, and plural circumferentially extending angularly spaced shelves protruding radially inwardly from the sleeve at the same horizontal level, each of said shelves having an indentation and a stop on its upper surface.

11. A fixture mounting ring comprising: a squat tubular circular sleeve defining a large central opening, said sleeve having at the lower end only thereof a radially outwardly extending flange from the periphery of which an annular downwardly extending short lip depends, and a set of externally located bosses protruding radially outwardly from the sleeve, said bosses having vertical openings extending through and terminating at the bottom surface of the flange.

12. A fixture mounting ring comprising: a squat tubular circular sleeve defining a large central opening, said sleeve having at the lower end only thereof a radially outwardly extending flange from the periphery of which an annular downwardly extending short lip depends, and a set of externally located bosses protruding radially outwardly from the sleeve, said bosses being of T-shaped cross-section and running vetrically and upwardly away from the flange, and said bosses having vertical openings extending through and terminating at the bottom surface of the flange.

13. A fixture mounting ring comprising: a squat tubular circular sleeve defining a large central opening, said sleeve having at the lower end only thereof a radially outwardly extending flange from the periphery of which an annular downwardly extending short lip depends, and a set of externally located bosses protruding radially outwardly from the sleeve, said bosses being of T-shaped cross-section and running vertically and upwardly away from the flange, and said bosses having radially disposed outwardly opening openings terminating at the outer circumferential surfaces of the bosses.

14. A fixture mounting ring comprising: a squat tubular circular sleeve defining a large central opening, said sleeve having at the lower end only thereof a radially outwardly extending flange from the periphery of which an annular downwardly extending short lip depends, and plural circumferentially extending angularly spaced shelves protruding radially inwardly from the sleeve at the same horizontal level, each of said shelves having an indentation and a stop on its upper surface, the end of each shelf remote from the stop consisting of a downwardly sloping ramp.

15. A fixture mounting ring comprising: a squat tubular circular sleeve defining a large central opening, and plural pairs of angularly disaligned lugs projecting radially inwardly from the sleeve, the lugs of each pair being situated at different vertical locations so as to define a radially inwardly opening clear space therebetween, all of said spaces being at the same horizontal level, the lower lug of each pair having a downwardly facing cam surface remote from the clear space for constricting an end of a tubular circular casing of a fixture inserted in the ring and urged against said lugs so as to reduce the diameter of said end of the casing to permit it to enter into the clear spaces between the pairs of lugs.

16. In combination a fixture mounting ring and mounting clips for the same; said fixture mounting ring comprising squat tubular circular sleeve defining a large central opening, a set of diametrically opposed externally located vertically oriented bosses protruding radially outwardly from the sleeve, said bosses being of T-shaped cross-section and running vertically and upwardly from the lower end of the sleeve, each boss having a different mounting clip associated therewith; each mounting clip comprising a base and a pair of wings, said base being seated on the external circumferential surface of the sleeve at the associated boss, said base having a notch at its lower side slidably engaging the shank of the T-shaped boss, said clip further including a radially outwardly offset tongue engaging the circumferentially outer surface of said boss, said wings extending radially outwardly from the base and diverging away from one another, said clip being resilient so that the wings can be flexed toward one another into parallelism, said wings having similarly disposed openings adapted to be registered upon flexure of the wings into parallelism for reception of straight supporting bars.

17. A combination as set forth in claim 16 wherein the wings of each clip have plural registrable openings at different horizontal levels for selective reception of a straight supporting bar.

18. A combination as set forth in claim 16 wherein each boss and the tongue of the associated clip have registered radial openings and wherein a fastening element is located in said openings.

19. In combination a fixture mounting ring and mounting clips and supporting bars for the same; said fixture mounting ring comprising a squat tubular circular sleeve defining a large central opening, a set of diametrically opposed externally located vertically oriented bosses protruding radially outwardly from the sleeve, said bosses being of T-shaped cross-section and running vertically and upwardly from the lower end of the sleeve, each boss having a different mounting clip associated therewith; each mounting clip comprising a base and a pair of wings, said base being seated on the external circumferential surface of the sleeve at the associated boss, said base having a notch at its lower side slidably engaging the shank of the T-shaped boss, said clip further including a radially outwardly offset tongue engaging the circumferentially outer surface of said boss, said wings extending radially outwardly from the base and diverging away from one another, said clip being resilient so that the wings can be flexed toward one another into parallelism, said wings having plural similarly disposed openings at different horizontal levels that are adapted to be registered upon flexure of the wings in the parallelism for selective reception of said supporting bars; said supporting bars having notched ends, the depth of the notches being half the distance between two adjacent horizontal levels of the openings.

20. In combination a fixture mounting ring and an apertured fixture ring; said fixture mounting ring comprising a squat tubular circular sleeve defining a large central opening, said sleeve having at the lower end only thereof a radially outwardly extending flange from the periphery of which an annular downwardly extending short lip depends and plural circumferentially extending angularly spaced shelves protruding radially inwardly from the sleeve at the same horizontal level, each of said shelves having an indentation and a stop on its upper surface; said apertured ring being located adjacent the flange with its periphery received within the annular lip and said ring having radially disposed outwardly extending pins at a common level, said pins being supported on said shelves in said indentations whereby the apertured ring is quickly removably attached to the mounting ring without the manipulation of supplemental attaching elements.

21. A combination as set forth in claim 20 wherein the mounting ring has a box defining a vertical slot and wherein the apertured ring has a drop leaf hinge including an elongated member captively slidable in said slot and means pivotally connecting an end of said member to the apertured ring, said connecting means being arranged to permit relative rotational movement between the mounting ring and the apertured ring.

22. In combination a fixture mounting ring and a junction box bracket; said fixture ring comprising a squat tubular circular sleeve defining a large central opening, and an externally located vertically located boss protruding radially outwardly from the sleeve, said boss being of T-shaped cross-section and running vertically and upwardly away from the lower end of the sleeve; said junction box bracket comprising a channel shape coupling telescopically on said boss.

23. In combination a fixture mounting ring and a fixture; said fixture mounting ring comprising a squat tubular circular sleeve defining a large central opening, and plural pairs of lugs protruding radially inwardly from the sleeve, the lugs of each pair being situated at different vertical locations so as to define a radially inwardly opening clear space therebetween, all of said spaces being at the same horizontal level, the lower lug of each pair having a downwardly facing cam surface remote from the clear space; said fixture comprising a circular tubular casing having an outwardly extending flange which is coupled with the ring by urging the flange against the cam surfaces so as to reduce the diameter of the flange and permit it to enter into the clear spaces between the pairs of lugs, the height of said flange slightly exceeding the height of the clear spaces so that the flange is frictionally engaged within said spaces.

24. In combination a fixture mounting ring and a fixture; said fixture mounting ring comprising a squat tubular circular sleeve defining a large central opening, and plural pairs of lugs protruding radially inwardly from the sleeve, the lugs of each pair being situated at different vertical locations so as to define a radially inwardly opening clear space therebetween, all of said spaces being at the same horizontal level, the lower lug of each pair having a downwardly facing cam surface remote from the clear space; said fixture comprising a circular tubular casing having an outwardly extending flange which is coupled with the ring by urging the flange against the cam surfaces so as to reduce the diameter of the flange and permit it to enter into the clear spaces between the pairs of lugs, the height of said flange being less than the height of the clear spaces so that said fixture rests on the lower lugs and can be turned within the mounting ring.

25. In combination a fixture mounting ring and mounting elements; said fixture mounting ring comprising a squat tubular circular sleeve defining a large central opening, a pair of radially outwardly protruding open ended diametrically opposed boxes defining a pair of diametrically opposed external vertical slots; said mounting elements comprising a pair of elongated members captively received in said slots and having means for connection to structural members of a building.

26. A combination as set forth in claim 25 wherein each mounting element is a malleable metal strap.

27. In combination a fixture mounting ring, a fixture and a bracket; said fixture mounting ring comprising a squat tubular circular sleeve defining a large central opening, said sleeve having radially protruding open ended bosses defining a set of vertical slots; said fixture and bracket having a coupling means interconnecting the same; said bracket including an elongated element received and held in said bosses.

28. In combination a fixture mounting ring and a trim ring; said fixture mounting ring comprising a squat tubular circular sleeve defining a large central opening, said sleeve having at the lower end only thereof a radially outwardly extending flange from the periphery of which an annular downwardly extending short lip depends; said trim ring being located below and covering the lower edge of said lip and said trim ring having means for securing the same to the mounting ring, said securing means comprising plural spring detents that are arranged to extend upwardly from the trim ring and bear against the upper surface of the flange.

29. In combination a fixture mounting ring and a disposable cover; said fixture mounting ring comprising a squat tubular circular sleeve defining a large central opening, said sleeve having at the lower end only thereof a radially outwardly extending flange from the periphery of which an annular downwardly extending lip depends; said cover comprising a sheet the periphery of which matches the internal shape of the lip, said sheet being seated against the under surface of the flange and fitted against the lip, and means detachably securing the sheet to the ring.

30. A combination as set forth in claim 29 wherein the detachable securing means comprises vertical openings in the ring and push pins having their heads engaging the under surface of the sheet and their shanks extending through said openings.

31. A combination as set forth in claim 29 wherein the cover has a weakened zone within the boundaries of the sheet and defining a closed contour so that a portion of the sheet can be knocked out to facilitate removal of the cover.

32. In combination a fixture mounting ring and top access clips, said fixture mounting ring comprising a squat tubular circular sleeve defining a large central opening, said sleeve having at the lower end only thereof a radially outwardly extending flange; each of said top access clips being of S-shaped configuration so as to provide one upwardly facing U-shaped portion and one downwardly facing U-shaped portion, the downwardly facing U-shaped portion being seated on the upper edge of the sleeve and the upwardly facing U-shaped portion being arranged to receive the lower rim of a tubular fixture.

33. A combination as set forth in claim 32 wherein each top access clip has a screw engaging the upwardly facing U-shaped portion with the tip of the screw between the arms of said U-shaped portion whereby said tip is adapted to be pressed against the external surface of the fixture seated in the clip.

34. In combination a large diameter fixture mounting ring, a small diameter fixture mounting ring and an adaptor ring; said large diameter fixture mounting ring comprising a squat tubular circular sleeve defining a large central opening, said sleeve having radially inwardly extending protuberances; said small diameter fixture mounting ring comprising a squat tubular circular sleeve defining a large central opening which is smaller than the central opening of the large diameter fixture mounting ring, the sleeve of the small diameter fixture mounting ring having at the lower end only thereof a radially outwardly extending flange from the periphery of which an annular downwardly extending short lip depends, the lower edge of said flange being coplanar with the lower edge of the sleeve of the large diameter fixture mounting ring; said adaptor ring being of circular configuration and having a large circular central opening to receive the sleeve of the small diameter fixture mounting ring, said adaptor ring having a downwardly depending annular flange at its outer periphery, the lower edge of said last named flange being coplanar with the lower edge of the lip of the small diameter fixture mounting ring, the adaptor ring flange having upwardly facing notches in which the protuberances of the large diameter fixture mounting ring are received, means securing the adaptor ring to the small diameter fixture mounting ring so that the adaptor ring and small diameter fixture mounting ring are functionally unitary; and quick detachable means connecting the adaptor ring with the large diameter fixture mounting ring.

35. A combination as set forth in claim 34 wherein the quick detachable means comprises latches mounted for radial slidable movement on the adaptor ring between a position in which the latches engage the upper surfaces of the protuberances of the large diameter fixture mounting ring and a position in which said latches disengage said protuberances.

36. A combination as set forth in claim 34 wherein the adaptor ring has extending upwardly therefrom plural pairs of lugs, the lugs of each pair being situated at different vertical locations so as to define a radially inwardly opening clear space therebetween, all of said spaces being at the same horizontal level, the upper lug of each pair having an upwardly facing cam surface for constricting an end of a tubular circular casing of a fixture urged against said lugs so as to reduce the diameter of said end of the casing to permit it to enter into the clear spaces between the pairs of lugs.

References Cited in the file of this patent

UNITED STATES PATENTS

| | | |
|---|---|---|
| 1,037,202 | Brown | Sept. 3, 1912 |
| 1,746,429 | Kelleweay | Feb. 11, 1930 |
| 2,525,315 | Schepmoes | Oct. 10, 1950 |
| 2,670,915 | Clark | Mar. 2, 1954 |
| 2,855,504 | MacDougall et al. | Oct. 7, 1958 |
| 2,966,326 | Liberman | Dec. 27, 1960 |
| 2,998,510 | Versen | Aug. 29, 1961 |
| 2,998,511 | Chan | Aug. 29, 1961 |
| 3,072,375 | Goldberg | Jan. 8, 1963 |